US012373848B2

(12) United States Patent
Aurongzeb et al.

(10) Patent No.: US 12,373,848 B2
(45) Date of Patent: *Jul. 29, 2025

(54) SYSTEM AND METHOD FOR ADAPTIVELY REDUCING CARBON FOOTPRINT FOR AN INFORMATION HANDLING SYSTEM

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 368 days.

This patent is subject to a terminal disclaimer.

(21) Appl. No.: 17/871,470

(22) Filed: Jul. 22, 2022

(65) Prior Publication Data
US 2024/0029078 A1 Jan. 25, 2024

(51) Int. Cl.
*G06Q 30/018* (2023.01)
*G06F 1/3296* (2019.01)

(52) U.S. Cl.
CPC ......... *G06Q 30/018* (2013.01); *G06F 1/3296* (2013.01)

(58) Field of Classification Search
CPC ....... G06Q 30/018; G06F 1/3296; G06F 1/28; G06F 3/04847
See application file for complete search history.

(56) References Cited

U.S. PATENT DOCUMENTS

| 7,694,291 B2 | 4/2010 | Chen |
| 8,626,450 B2 | 1/2014 | Dooley |
| 8,904,374 B2 | 12/2014 | Nakamura |
| 10,146,286 B2 | 12/2018 | Lee |

(Continued)

FOREIGN PATENT DOCUMENTS

WO    2011/106160 A2    9/2011

OTHER PUBLICATIONS

C. Herrmann, et al., "Sustainability as Strategic Business Model for Profitable Business," 6 pages, May 2014.

(Continued)

*Primary Examiner* — Chad G Erdman
(74) *Attorney, Agent, or Firm* — Prol Intellectual Property Law, PLLC; H. Kenneth Prol

(57) ABSTRACT

An adaptive carbon dioxide ($CO_2$) emissions reduction system operating on a client information handling system may comprise a processor, a network interface device, and a graphical user interface (GUI) to gather analytics for an executing software application hardware power consumption analytics, and a location for the client information handling system, determine a power $CO_2$ emissions value estimating $CO_2$ emitted during a measured consumption of power at the location based on the hardware power consumption analytics, determine that updated power consumption exceeds a maximum power draw threshold value determined based on user input for decreasing the power $CO_2$ emissions value and location, and display a hardware reconfiguration recommendation for reconfiguring a hardware component currently configured for high performance to a power conservation setting.

20 Claims, 5 Drawing Sheets

(56) References Cited

U.S. PATENT DOCUMENTS

| | | |
|---|---|---|
| 10,254,808 B2 | 4/2019 | Messick |
| 10,289,184 B2 | 5/2019 | Malik |
| 10,705,786 B2 | 7/2020 | Liu |
| 10,938,954 B2 | 3/2021 | Lee |
| 10,977,293 B2 | 4/2021 | Cai |
| 11,009,938 B1 | 5/2021 | Law |
| 2009/0292617 A1 | 11/2009 | Sperling |
| 2010/0070404 A1 | 3/2010 | McConnell |
| 2014/0100937 A1 | 4/2014 | Na |
| 2014/0316964 A1 | 10/2014 | Slutsker |
| 2014/0325481 A1* | 10/2014 | Pillai .................. G06F 11/3003 717/124 |
| 2019/0349321 A1 | 11/2019 | Cai |
| 2021/0373638 A1 | 12/2021 | Schluessler |
| 2023/0245009 A1* | 8/2023 | Roy ..................... G06F 1/3206 705/7.12 |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

\* cited by examiner

SYSTEM AND METHOD FOR ADAPTIVELY REDUCING CARBON FOOTPRINT FOR AN INFORMATION HANDLING SYSTEM

FIELD OF THE DISCLOSURE

The present disclosure generally relates to determining an amount of greenhouse gas emissions that may be attributable to hardware component power consumption at an information handling system. More specifically, the present disclosure relates to a method of adaptively adjusting hardware and firmware configurations and policies during periods of high power consumption in order to decrease $CO_2$ emissions from hardware components of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
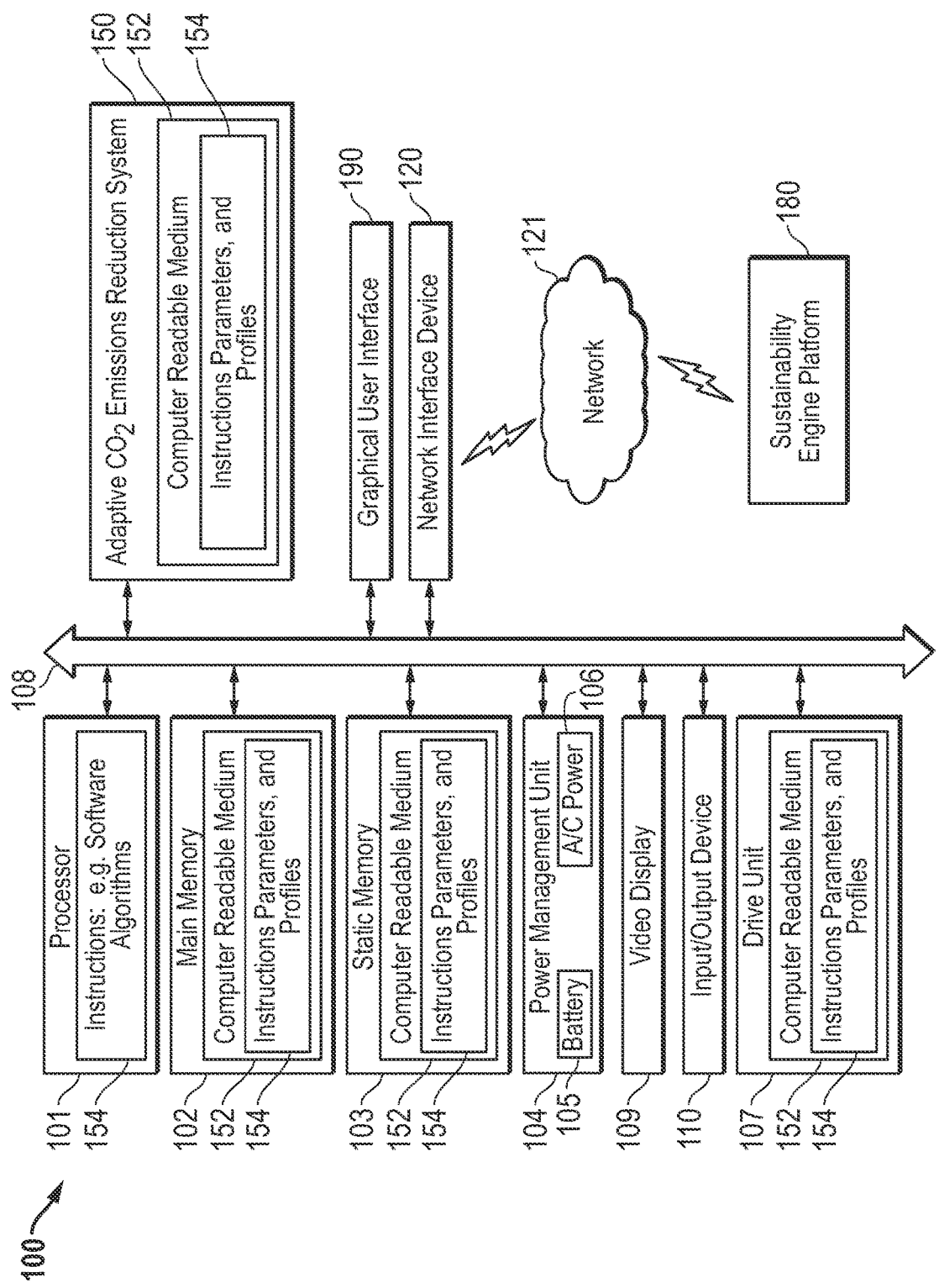
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever-increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One major impact on such GHG emissions is the consumption of power at end devices such as information handling systems operated by an end user. The adaptive $CO_2$ emissions reduction system in embodiments of the present disclosure address this issue by routinely tracking and reporting equivalent $CO_2$ emissions generated due to consumption of power and execution of software applications at the client information handling system over preset monitoring periods and adaptively adjusting hardware and firmware configurations and policies during periods of high power consumption in order to decrease $CO_2$ emissions.

Although power consumption at an information handling system in an embodiment may not directly generate GHGs (e.g., $CO_2$), such power consumption may be associated with indirect GHG emissions. For example, power consumed by a client information handling system may be drawn from a power plant burning fossil fuels or other renewable or non-renewable resources to generate such power. The burning of fossil fuels or other resource consumption at the power plant may directly generate GHGs. The adaptive $CO_2$ emissions reduction system operating at a client information handling system in embodiments of the present disclosure may identify when power consumption is higher than an average, or expected rate, and initiate power conservation settings for various hardware components to decrease such power consumption.

For example, the adaptive $CO_2$ emissions reduction system in embodiments of the present disclosure may determine average power consumption by various hardware components or average power consumption due to software or firmware updates during a current monitoring period and one or more previous monitoring periods. The adaptive $CO_2$ emissions reduction system in embodiments may compare current monitoring period analytics to previous monitoring period analytics to identify a source of higher-than-average power consumption, such as an underperforming hardware component, or an inefficient, failing, or unnecessary update of software or firmware. Recommendations may be made by the adaptive $CO_2$ emissions reduction system in embodiments to adjust configurations or policies of hardware components, or methods of updating software or firmware in order to alleviate the higher power consumption detected by the adaptive $CO_2$ emissions reduction system. In such a way, the adaptive $CO_2$ emissions reduction system may monitor power consumption at a client information handling system and adaptively adjust policies and configurations for hardware or methods of software or firmware updating in order to decrease power usage during high power consumption periods, and particularly when power consumption during those periods generates higher GHG levels depending on the power source.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory 102, (with computer readable medium 154 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a network interface device 120, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101 executing instructions of a client device adaptive carbon dioxide (CO2) emissions reduction system 150, the wireless network interface device 120, a static memory 103 or drive unit 107, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 154, such as for the adaptive CO2 emissions reduction system 150 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a graphics processing unit (GPU), a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 154 storing instructions 154. In some embodiments, information handling system 100, or portions thereof, may represent a client information handling system 100 operating various hardware components (e.g., processor 101, memory 102, network interface device 120, power management unit 104) during execution of various software applications, operating system (OS) software, application software, BIOS software, or other software applications or drivers detectable by processor type 101, and executing an agent of the adaptive CO2 emissions reduction system 150, as described in greater detail below with respect to FIG. 2. In other embodiments the information handling system 100 may represent a server information handling system of a remote Unified Endpoint Management (UEM) platform 180 in communication with the client information handling system 100 via the network 121.

The disk drive unit 107 and static memory 103 may also contain space for data storage in a computer readable medium 154. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

The network interface device 120 may provide connectivity of the information handling system 100 to the network 121 via a dedicated link, a network AP or base station in an embodiment. The network 121 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 121 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 121, one or more APs for those networks, or to a docking station in an embodiment may be via wired or wireless connection. In some aspects of the present disclosure, the network interface device 120 may operate two or more wireless links. In other aspects of the present disclosure, the information handling system 100 may include a plurality of network interface devices, each capable of establishing a separate wireless link to network 121, such that the information handling system 100 may be in communication with network 121 via a plurality of wireless links.

The network interface device 120 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 120, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 120 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 121 may communicate voice, video or data over the network 121. Further, the instructions 154 may be transmitted or received over the network 121 via the network interface device 120. The information handling system 100 may include a set of instructions 154 that may be executed to cause the computer system to perform any one or more of the methods or computer-based functions disclosed herein, such as determining an amount of greenhouse gas emissions that may be attributable to usage at an information handling system of power, tracking such greenhouse gas emissions over time, and making recommendations for hardware configuration or firmware and software updates that may reduce such emissions. For example, instructions 154 may include a particular example of an adaptive CO2 emissions reduction system 150, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

The adaptive CO2 emissions reduction system 150 may utilize a computer-readable medium 154 in which one or more sets of instructions 154 may operate in part as software or firmware instructions executed on the information handling system 100. The instructions 154 may embody one or more of the methods or logic as described herein. For example, instructions relating to the adaptive CO2 emissions reduction system 150, firmware or software algorithms, processes, and/or methods may be stored here. Such instructions 154 may comprise determining an amount of greenhouse gas emissions that may be attributable to usage at an information handling system of power, tracking such greenhouse gas emissions over time, and making recommendations for hardware configuration or updates to software or firmware that may reduce such emissions. The adaptive CO2 emissions reduction system 150 may operate at a client information handling system 100 in communication with a Unified Endpoint Management (UEM) platform 180 that gathers telemetries from a plurality of client information handling systems (e.g., including 100) via the network 121 that describe operating environments for those client information handling systems (e.g., 100). The UEM platform 180 in an embodiment may operate to identify information technology (IT) issues at client information handling systems (e.g., 100), and to provide support for such issues, including automatically updating drivers or hardware components, as needed. The UEM platform 180 in an embodiment may operate as a cloud-based service to store data (e.g., operating environment telemetries for remote client information handling systems) within memory 102, static memory 103, or computer readable medium 154 received via network 121. In some embodiments the information handling system 100 may be a server executing a UEM platform 180. In other embodiments, the information handling system 100 may depict a client information handling system that reports to a UEM 180 and receives information about other client information handling systems from the UEM 180 pursuant to various embodiments described herein. In an embodiment, information handling system 100 can also execute code instructions 154 of a power analytics module, or an application analytics module. Information handling system 100 can also operate as a Unified Endpoint Management (UEM) platform and execute code instructions 154 of a sustainability engine, a systems internal health assessor, or a CO2 optimization engine according to various embodiments herein.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the adaptive CO2 emissions reduction system 150 may be stored in static memory 103, or the drive unit 107 on a computer-readable medium 154 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
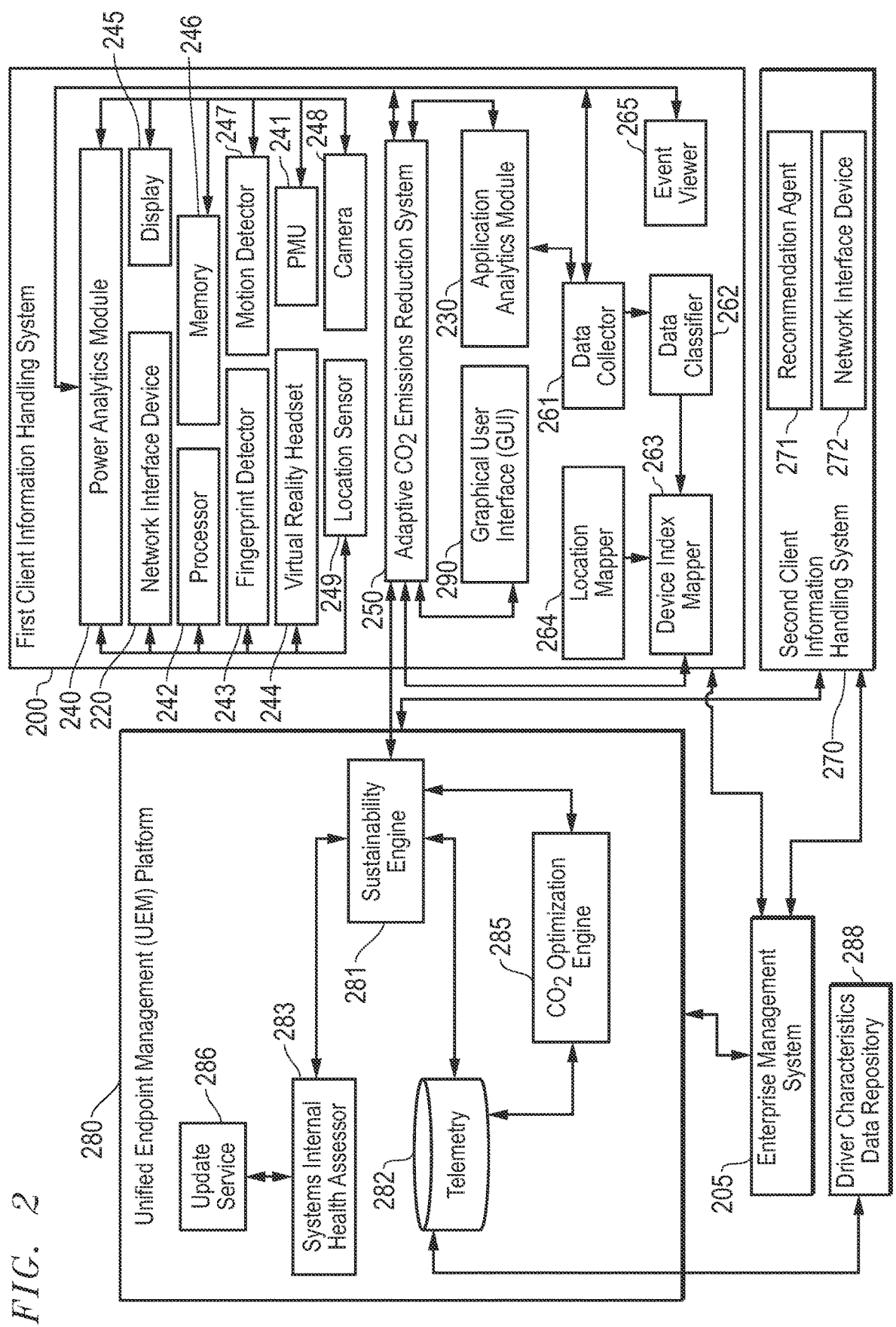
FIG. 2 is a block diagram illustrating an adaptive $CO_2$ emissions reduction system of a client information handling system according to an embodiment of the present disclosure.

FIG. 2 is a block diagram illustrating a client device CO2 reduction system of a client information handling system communicating CO2 emissions associated with application and power usage at the client information handling system to a sustainability engine according to an embodiment of the present disclosure. A first client information handling system 200 in an embodiment may execute an adaptive client device CO2 reduction system 280 under management of or in communication with an enterprise management system 205, which may act as an interface between a plurality of client information handling systems (e.g., 200 or 270) and a unified endpoint management (UEM) platform 280. The UEM platform 280 and enterprise management system 205 in an embodiment may operate as a cloud-based service in communication with the enterprise management system 205 via a network to identify information technology (IT) issues at a first client information handling system 200, or a second client information handling system 270. The UEM platform 280 may also provide support for such issues, including automatically updating drivers or hardware components, as needed. In a specific embodiment of the present disclosure, the UEM platform 280 may gather telemetries from a plurality of client information handling system (e.g., 200 and 270) that describe operating environments for those client information handling systems (e.g., power usage by a plurality of hardware components, or analytics for software or firmware usage).

An adaptive client device CO2 reduction system 250 operating at the first client information handling system 200 in an embodiment may determine an amount of greenhouse gas (GHG) emissions that may be attributable to power consumption, and recommend adjustments to configuration and policies for hardware or firmware or methods for updating software or firmware to minimize such emissions in order to meet a user-specified maximum CO2 or GHG emissions value. This tracking and generation of recommendations may be made based upon telemetry data gathered from a pool of information handling systems including 200 and 270, and others in various embodiments. For example, estimated CO2 or GHGs emitted due to consumption of power at the client information handling system 200 in an embodiment may depend upon the geographic location at which the client information handling system 200 consumed such power directly from an alternating current (A/C) power source (e.g., wall outlet), or the geographic location at which the client information handling system 200 last charged the battery, if the hardware components are consuming battery power. The UEM platform 280 may receive such telemetries from a plurality of client information handling systems (e.g., 200 and 270), which may be managed by the same enterprise management system (e.g., 205), or may be managed by separate enterprise management systems in various embodiments.

Each client information handling system (e.g., 200 or 270) in an embodiment may include a plurality of hardware components. For example, a first client information handling system 200 in an embodiment may include a network interface device 220, a processor (e.g., central processing unit (CPU), graphics processing unit (GPU), or visual processing unit (VPU)) 242, a display 245, and a memory 246, and one or more components of a power supply unit 241 (e.g., battery). In some embodiments, the first client information handling system 200 may further include one or more sensing devices, such as a motion detector 247, fingerprint detector 243, camera 248, or location sensing devices 249 (e.g., GPS location unit). In still other embodiments, the first client information handling system 200 may also include one or more peripheral devices, such as the virtual reality headset 244.

A power analytics module 240 in an embodiment may be in communication with various hardware components (e.g., 220, 241, 242, 243, 244, 245, 246, 247, 248, or 249) and firmware for those components in an embodiment. For example, the power analytics module 240 may monitor power consumption by each of the various hardware components (e.g., 220, 241, 242, 243, 244, 245, 246, 247, 248, or 249). As described in greater detail with respect to FIG. 3 at block 304 and FIG. 4 at block 406, estimated CO2 or GHGs emitted due to consumption of power at the client information handling system 200 in an embodiment may depend upon the geographic location at which the client information handling system 200 consumed such power directly from an alternating current (A/C) power source (e.g., wall outlet), or the geographic location at which the client information handling system 200 last charged the battery, if the hardware components are consuming battery power. Thus, the power analytics module may monitor when hardware components (e.g., 220, 241, 242, 243, 244, 245, 246, 247, 248, or 249) are operating on A/C or battery power in an embodiment. In another example embodiment, the power analytics module 240 may also access firmware for hardware components (e.g., 220, 241, 242, 243, 244, 245, 246, 247, 248, or 249) to determine policies or settings for those components at the time of such power measurements.

More specifically, the power analytics module 240 in an embodiment may determine whether a network interface device 220 is transceiving according to WLAN, WWAN, Bluetooth®, or Near Field Communication (NFC) standards, as well as policies setting a preference for one type of standard over another, or restrictions on power consumption, data rate, or frequencies used by the network interface device 220. In another example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In still another example, the power analytics module may determine current usage of memory resources by software applications as a percentage of total capacity for memory 246, time required to process requests to access such memory 246, and identify software applications most frequently accessing such memory 246. In yet another example, the power analytics module 240 in an embodiment may determine a current usage of the display by software applications as a percentage of display time in which GUI for a specific software application is visible, and a usage mode for the display 245, such as day mode, night mode, power reserve mode, or gaming mode (e.g., high-resolution).

In another example, the power analytics module 240 in an embodiment may determine current usage of network interface device resources by software applications as a percentage of total capacity for the network interface device 220 to transceive data (e.g., percentage of total available throughput used). In still another example embodiment, the power analytics module 240 may determine policies controlling the periods in which sensing hardware may be operational. More specifically, the power analytics module 240 in an embodiment may determine whether the fingerprint detector 243, motion detector 247, location sensing device (e.g., GPS unit) 249, or camera 248 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 248, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

The adaptive CO2 emissions reduction system 250 in an embodiment may use these received power consumption values to determine when specific hardware components are underperforming or when software or firmware are inefficiently or unnecessarily performing updates, possibly increasing power consumed by that device, as described in greater detail below. The power analytics module 240 in an embodiment may also be capable of adjusting policies and configurations for such hardware components or updates, upon user approval. For example, the power analytics module 240 in an embodiment may instruct a network interface device 220 to transceive according to the Bluetooth®, rather than WLAN or WWAN, or reset policies for the network interface device 220 to restrict power consumption, data rate, or frequencies used. In another example, the power analytics module 240 in an embodiment may adjust the usage mode for the display 245 to a lower power consumption mode, such as power reserve mode, or lower resolution mode. In still another example embodiment, the power analytics module 240 may decrease the periods in which sensing hardware may be operational, such as restricting such periods to when the first client information handling system 200 is in a closed position, an idle or sleep mode, currently moving, or in startup mode. In yet another embodiment, the power analytics module 240 may adjust the media capture instructions setting for the camera 248 by decreasing a resolution of captured images or a frequency at which those images are captured, or limiting execution of any processing algorithms that may be applied to those images (e.g., zooming, cropping, background image application, boundary recognition, face recognition, smoothing, etc.).

In an embodiment, the power analytics module 240 may also be capable of determining the current versions of drivers for various hardware components (e.g., 220, 241, 242, 243, 244, 245, 246, 247, 248, or 249). In some embodiments, the power analytics module 240 may receive updated drivers, direct installation of those drivers, or pause repeated attempts at unsuccessful driver installations in order to increase efficiency of associated hardware components (e.g., 220, 241, 242, 243, 244, 245, 246, 247, 248, or 249). In other embodiments, the power analytics module 240 may also identify and delete obsolete or redundant files associated with previously replaced or obsolete drivers, and track power consumed during installation or updating of such drivers. In still other embodiments, the power analytics module 240 may further determine power consumed during updates made to various software applications executing via the processor 242 (e.g., CPU, GPU, or VPU).

As described above, the power analytics module 240 may be in communication with a data collector 261, which may also be in communication with an application analytics module 230. In an embodiment, the application analytics module 230 may monitor and adjust execution of software applications within the operating system (OS) for the first client information handling system 200. The application analytics module 230 in an embodiment may further track which software applications are running or idle (e.g., executing in the background) at various times, track CPU utilization, and track current versions of software applications and times at which updates to such software applications are performed.

As described herein, the data collector module 261 in an embodiment may gather data regarding hardware configuration and power consumption from the power analytics module 240 and data regarding software updating from the application analytics module 230. In some embodiments, the data collector 261 may also gather information from an event viewer 265 (e.g., Microsoft® Event Viewer) tracking computing events relating to software, firmware, and hardware in real-time. Such events may include notification of errors relating to various attempted processes at the first client information handling system 200. More specifically, the event viewer 265 in an embodiment may record one or more Windows Hardware Error Architecture (WHEA) events indicating a hardware error, a failed attempt at firmware or software updating, or an unusually high consumption of power by hardware components. Such WHEA events may be associated with data packets that specifically identify the hardware component (e.g., 220, 241, 242, 243, 244, 245, 246, 247, 248, or 249) producing the error or consuming the unusually high power levels, or identifying the driver or software application associated with a failed update. The data collector 261 may routinely collect information from each of the power analytics module 240, the application analytics module 230 or the event viewer 265 at preset intervals, or may do so upon notification by one of these modules (e.g., 230, 240, or 265) of a specific event, failure, or warning, such as a power draw measurement exceeding a preset maximum power draw threshold value.

The data collector 261 in an embodiment may gather such information from the power analytics module 240, event viewer 265, or application analytics module 230 at preset intervals in some embodiments. For example, such a preset interval may be set to a default value (e.g., one hour, one day, one week), or may be set by the user of the first client information handling system 200 via the graphical user interface (GUI) 290. The client device adaptive CO2 emissions reduction system 250 in an embodiment may determine average power consumption due to software updates, firmware updates, or operation of various hardware components for each such preset interval or monitoring period, as described in greater detail with respect to FIG. 4, below. In addition, the client device CO2 emissions tracking system 250 in an embodiment may further compare average power consumption due to software updates, firmware updates, or operation of various hardware components at the client information handling system 200 during a current monitoring period against such average power consumption values determined for a previous monitoring period, as also described in greater detail below with respect to FIG. 4.

Information recorded by the event viewer 265 in an embodiment may be output in the form of a log, while information recorded by the power analytics module 240 or the application analytics module 230 may be output into reports. The format of such a log or report may vary, which may require reformatting of such information into an easily classified, sorted, and searchable format. Thus, the data collector 261 in an embodiment may operate to reformat any received logs or reports into a predetermined data interchange format such as JavaScript Object Notation (JSON), or Extensive Markup Language (XML). Specific examples described herein may use the JSON format for consistency and ease of explanation, but any other type of existing or later developed predetermined data interchange format agreed upon between data sinks and sources may be used in various embodiments, including Yet Another Markup Language (YAML), for example.

The data collector 261 in an embodiment may transmit information received at any given time from the power analytics module 240, application analytics module 230, or event viewer 265) and reformatted to a predetermined data interchange format (e.g., JSON) based to a data classifier 262. Such a JSON-formatted report or log may be referred to herein as a JSON event. Each JSON event may include any information gathered from the power analytics module 240, application analytics module 230, or event viewer 265 and a time stamp associated with either the time the analytics module report was generated, or the time at which a WHEA (or other known convention for categorizing processing events) error occurred. A JSON event may include a single WHEA error (e.g., processors 242 or 272 error), or a single notification or warning from an analytics module (e.g., temperature monitor recorded a temperature exceeding a preset maximum temperature threshold value). A plurality of JSON events may be gathered to generate a JSON incident, which may include information routinely gathered at intervals, such as current configurations or policies for various hardware components (e.g., 220, 241, 242, 243, 244, 245, 246, 247, 248, or 249) or software applications, power consumption of those components over a known monitoring time period, current versions of drivers or software applications, and timestamps for installation of updates to such drivers or software applications. Such information may be illustrated by the following table:

TABLE 1

| | |
|---|---|
| Timestamp | 1655156447 |
| Client Device ID | 123456 |
| Incident ID | 456789 |
| Errors, notifications, warnings | Display Driver 14.3 Install Unsuccessful |
| Location | Austin, TX |
| Model | Laptop 7400 |
| Hardware Configuration | WLAN network interface device; WWAN network interface device; Bluetooth ® network interface device; 16 GB memory; X series CPU; G Series GPU; 256 GB Solid State Drive (SSD); 15.6 inch full high definition (HD) organic light emitting diode (OLED) display; Display driver version 14.2 Virtual Reality headset peripheral; Motion detector; Camera; Fingerprint detector; |
| Hardware Performance | WWAN Interface Device transceived 100 GB Display in High Definition Mode Motion Detector Set to Continuous Monitor Camera in High Resolution Mode |
| Software Performance | Operating System 10.2; Display Driver Install Time 97 minutes |

Some or all of the information displayed above within TABLE 1 may be formatted as a JSON incident in an embodiment, where the JSON incident may represent all of the information given within the table and may include one or more JSON events. A JSON event in an embodiment may be a single dataset name/value pair, formatted into a JSON-formatted string value. For example, the first row of Table 1 may provide information that can be stored as a dataset field name (e.g., "Timestamp") and a dataset field value (e.g., "1655156447") which may be combined to form a name/value pair. This name/value pair may be rewritten as a JSON-formatted string value (e.g., "Timestamp": 1655156447) to form a single JSON event. In another example, the fourth row of Table 1 may provide information that forms a plurality of JSON events. For example, information from the row titled "hardware performance" may be stored as a first name/value pair having a field name "WWAN_radio_rate" and a value of 100 GB, and as a second name/value pair having a field name "Display_mode" and a value of high_definition. The reports and error logs generated by the power analytics module 240, the application analytics module 230, and the event viewer 265 in an embodiment may each include one or several of such name/value pairs, and thus, may form the foundation of one or several JSON events.

A plurality of JSON events may be combined into a single JSON incident in an embodiment. Such a JSON incident may include a plurality of JSON events generated based on name/value pairs from one or more reports and error logs from the power analytics module 240, the application analytics module 230, or the event viewer 265. For example, in one embodiment, the first information handling system 250 may generate a single JSON incident for each report or event log generated by the application analytics module 230, power analytics module 240, or event viewer 265. In another example embodiment, the first information handling system 250 may routinely generate a single JSON incident at preset intervals, which may include all information from all reports or event logs generated by the application analytics module 230, the power analytics module 240, or the event viewer 265 during this preset interval. Thus, a JSON incident may include at least two JSON events, including a timestamp for the generation of the JSON incident (e.g., the time at which the underlying report or event log was generated, or the time at which such underlying reports or event logs were compiled together for a given preset time period), as well as at least one name/value pair indicating the contents of such an underlying report or event log.

A JSON incident may identify an incident ID, a source for dataset name/value pairs used to generate one or more JSON events (e.g., power analytics module 240, applications analytics module 230, or event viewer 265), a timestamp for the incident, one or more custom flags identifying the errors, notifications, or warnings, and one or more device current states, identifying the software and hardware configurations and performance statistics. For example, a JSON incident compiling information shown within Table 1 above may be shown as:

```
{
  "data" :
  {
    "incident_id" : 456789,
    "source_ID" : power_analytics_module,
    "timestamp_unixtime_ms" : 1544145336,
    "custom_flags" :
    {
      "Unsuccessful_driver_install_attempts" :
        display_driver_14.3,
      "Device_Driver_Call_Failure_Rate" : 0.55
    }
    "device_current_state" :
    {
      "NID_1_type" : WLAN,
      "NID_2_type" : WWAN,
      "NID_2_data_transceived" : 100 GB,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "Display_driver_version" : 14.2,
      "Display_mode" : high_definition,
      "Camera_type" : webcam,
      "Camera_detection_mode" : continuous_monitor,
      "Camera_capture_mode" : high_resolution,
      "OS_Version" : 10.2,
      "Video_Conference_App" : Active,
      "Gaming_App" : Active,
      "Code_Compiling_App" : Background,
    }
  }
}
```

In other embodiments, TABLE 1 and the correlating JSON incident may further include identification of additional hardware components actively operating at the client information handling system 250, such as the fingerprint detector 243, motion detector 247, virtual reality headset 244, PMU 241, or GPS unit 249. The example given above in TABLE 1 and the corresponding above JSON incident may further include any number of other errors, notifications, or warnings, hardware configurations, software performance analytics, or descriptions of policies in place for hardware or software at the client information handling system 250, as monitored by either the power analytics module 240 or the application analytics module 230.

Upon reformatting of information in an embodiment, the data collector 261 may transmit the JSON incident to the data classifier 262. In an embodiment, the data classifier 262 may operate to analyze the contents of the JSON incident, to classify the type of JSON events included therewithin, and to edit the JSON incident to generate a second JSON incident that includes that classification type. Classification types may be preset according to instructions received by the adaptive CO2 emissions reduction system 250 via the GUI 290 or via the enterprise management system 205 or sustainability engine 281. Such classification types may assist the sustainability engine 281 and systems internal health assessor 283 in determining ways to optimize firmware or software updates and driver performance, as described in greater detail below with respect to FIG. 4. For example, the adaptive CO2 emissions reduction system 250 may identify repeated and failed attempts at driver installations, usage of obsolete drivers, or obsolete or redundant software or firmware update files. These classifications may also assist the SIHA 283 to identify hardware configurations currently in place that are optimized for performance, rather than power consumption. For example, the SIHA 283 may identify when the network interface device is transceiving via a relatively high power radio, or at a high gain, when the CPU is receiving a higher than average number of interrupt signals, when the display and associated drivers are operating in a high resolution mode or applying audio/video processing methods to enhance viewing quality, or when sensing devices (e.g., 243, 247, 248, 249) are set to continuously monitor the surrounding area.

Incident classifications in an embodiment may be associated with one or more previously identified event values. For example, an incident classification for "workload," identifying relatively high workloads that may result in various hardware component failures in an embodiment may be associated by the adaptive CO2 emissions reduction system 280 with JSON events titled "CPU workload code compiling software app" having a value exceeding a preset threshold value (e.g., 85%). In another example, an incident classification for "Config," identifying a hardware configuration or policy that may result in various hardware component underperformance or high power consumption in an embodiment may be associated with JSON events titled "Config," having a value such as "full power mode" (e.g., indicating full power supplied to the display), "continuous_monitor mode" (e.g., indicating sensing hardware components set to remain on), "High_Definition_Mode" (e.g., indicating GPU or display set to display in high definition), or "high_resolution_mode" (e.g., indicating camera set to capture images in high resolution. In yet another example, an incident classification for "app_usage," identifying relatively intensive usage of software applications that may result in various hardware component failures in an embodiment may be associated with JSON events titled "App_usage" having a value exceeding a preset threshold value (e.g., 85%).

In still another example, an incident classification for "driver_perf," identifying poor or inefficient driver performance (e.g., as indicated by a percentage of calls to that driver resulting in an error over a preset time period) that may result in various hardware component failures in an embodiment may be associated with JSON events titled "driver_perf" having a value exceeding a preset threshold value (e.g., 50%). In another example of an incident classification for "driver_perf," the data classifier 262 may identify a JSON event titled "unsuccessful_driver_install_attempts," having a value of "display_driver_14.3," indicating failed attempts to update the display driver from version 14.2 to 14.3 may be classified as "driver_perf." In yet another example, an incident classification for "background usage," identifying relatively intensive usage of software applications operating in idle mode or in the background that may result in various hardware component failures in an embodiment may be associated with JSON events titled "background usage" having a value exceeding a preset threshold value (e.g., 85%). Any numerical or percentage maximum application usage threshold values preset as described directly above may be set to any number between one and one hundred in various embodiments described herein.

In an example embodiment, the data classifier 262 in an embodiment may analyze the JSON incident described above to identify whether any of the JSON events and values associated with preset incident classifiers appear within the JSON incident. For example, the data classifier 262 in an embodiment may determine the JSON incident described above includes the JSON event named "unsuccessful_driver_install_attempts," having a value of "display_driver_14.3," indicating a failed attempt at installing an updated display driver. In such an example embodiment, the data classifier 262 may classify the JSON incident described above as "driver_perf," indicating underperformance of a driver. As another example, the data classifier 262 in an embodiment may determine the JSON incident described above includes the JSON event named "device_driver_call_failure_rate," having a value of 0.55, which may be above a preset maximum driver call failure rate of 50%, indicating a failed attempt at installing an updated display driver. In such an example embodiment, the data classifier 262 may classify the JSON incident described above as "driver_perf," indicating underperformance of a driver.

In still another example, the data classifier 262 in an embodiment may determine the JSON incident described above includes the JSON event named "NID_2_data_transceived," having a value of 100 GB, which may be above a preset high power transmission threshold value of 10 GB, indicating a high power gain on the WWAN interface device. In such an example embodiment, the data classifier 262 may classify the JSON incident described above as "config," indicating the WWAN interface device is configured for high performance, rather than power conservation. In yet another example, the data classifier 262 in an embodiment may determine the JSON incident described above includes the JSON event named "display_mode," having a value of "high definition," indicating the display is set to display video in high definition. In such an example embodiment, the data classifier 262 may classify the JSON incident described above as "config," indicating the display device is configured for high performance, rather than power conservation. In still another example, the data classifier 262 in an embodiment may determine the JSON incident described above includes the JSON event named "camera_detection_mode," having a value of "continuous_monitor," indicating the camera is set to continuously monitor the surrounding area of the first client information handling system 200. In such an example embodiment, the data classifier 262 may classify the JSON incident described above as "config," indicating the camera is configured for high performance, rather than power conservation. As yet another example, the data classifier 262 in an embodiment may determine the JSON incident described above includes the JSON event named "camera_capture_mode," having a value of "high_resolution," indicating the camera is set to capture images in at a high resolution. In such an example embodiment, the data classifier 262 may classify the JSON incident described above as "config," indicating the camera is configured for high performance, rather than power conservation.

The data classifier 262 in an embodiment may apply such a classification by editing the JSON incident received from the data collector 261 to generate a classified JSON incident that includes the following incident classification(s), in addition to the JSON events described above, within the JSON incident:

```
{
    "incident_class" : Workload,
    "incident_class" : Driver_perf,
}
```

The classified JSON incident in an embodiment may be transmitted to the device index mapper 263, which may operate to associate the classified JSON incident with a device ID and device model for the first client information handling system 200. Such a device ID in an embodiment may be one of several device IDs for a plurality of information handling systems (e.g., including the first and second client information handling systems 200 and 270) stored at the UEM platform 280. In some embodiments, the device index mapper 263 may also retrieve a location for the first client information handling system 200 from the location mapper 264 or the GPS unit 249. In some cases, the location mapper 264 may represent the location of the first client information handling system 200 with reference to its location within a campus of an enterprise. More specifically, the first client information handling system 200 may be located on a specific floor of a specific building. The device index mapper 263 in an embodiment may then edit the classified JSON incident to generate an indexed and classified JSON incident that includes this information, such as shown directly below, which is then transmitted to the adaptive CO2 emissions reduction system 250, and then to the sustainability engine 281 of the UEM platform 280:

```
{
    "data" :
    {
        "incident_id" : 456789,
        "source_ID" : power_analytics_module,
        "timestamp_unixtime_ms" : 1544145336,
        "custom_flags" :
        {
            "Unsuccessful_driver_install_attempts" :
            display_driver_14.3,
            "Device_Driver_Call_Failure_Rate" : 0.55
        }
        "device_current_state" :
        {
            "NID_1_type" : WLAN,
            "NID_2_type" : WWAN,
```

-continued

```
            "NID_2_data_transceived" : 100 GB,
            "NID_3_type" : BT,
            "memory_type" : 16_GB,
            "CPU_type" : X_Series,
            "GPU_type" : G_Series,
            "SSD_type" : 256_GB,
            "Display_type" : 15.6_HD_OLED,
            "Display_driver_version" : 14.2,
            "Display_mode" : high_definition,
            "Camera_type" : webcam,
            "Camera_detection_mode" : continuous_monitor,
            "Camera_capture_mode" : high_resolution,
            "OS_Version" : 10.2,
            "Video_Conference_App" : Active,
            "Gaming_App" : Active,
            "Code_Compiling_App" : Background,
        }
    }
    {
        "incident_class" : Workload
        "incident_class" : Driver_perf,
    }
```

The UEM platform 280 in an embodiment may receive indexed and classified JSON incidents, such as that described above, from a plurality of client information handling systems (e.g., 200 and 270). The UEM platform 280 in an embodiment may include a sustainability engine 281, telemetry storage 282, a systems internal health assessor (SIHA) 283, a CO2 optimization engine 285, and an update service 286. The sustainability engine 281 in an embodiment may operate to routinely gather indexed and classified JSON incidents from client device adaptive CO2 emissions reduction systems (e.g., 250 and 271) operating at a plurality of information handling systems (e.g., 200, and 270, respectively). Each indexed and classified JSON incident thus received in an embodiment may be stored in telemetry 282 for later analysis by the CO2 optimization engine 285, the SIHA 283, or the adaptive CO2 emissions reduction system 250.

The CO2 optimization engine 285 in an embodiment may store information such as known statistics for GHG emissions due to power consumption in the measured location of a client information handling system (e.g., 200) actively using A/C power or power stored when a battery was charged. Upon receipt of the telemetry identifying the location of the first client information handling system 200 in an embodiment, the sustainability engine 281 may retrieve a distributed power CO2 emissions value for the geographic location of the first client information handling system from the CO2 optimization engine 285. As described herein, the distributed power CO2 emissions value may be determined for the location at which the first client information handling system 200 directly consumed A/C power (e.g., via a wall socket), or the location at which the first client information handling system 200 battery was last charged, if the hardware components are consuming battery power. Such a distributed power CO2 emissions value may describe the amount of GHG emitted during the generation of a single unit of power (e.g., one kWh) by a power plant known to supply power within the geographic region including the location of the first information handling system 200 actively using A/C power or power stored when a battery was charged. The sustainability engine 281 in an embodiment may transmit this distributed power CO2 emissions value for the geographic location of the first information handling system 200 to the client device adaptive CO2 emission reduction system 250.

The SIHA 283 in an embodiment may operate, in part, to monitor efficiency of software or firmware updates across a plurality of client information handling systems (e.g., 200 or 270) during a plurality of monitoring periods. For example, telemetry 282 in an embodiment may store indexed and classified JSON incidents received from a plurality of client information handling systems (e.g., 200 and 270) over several monitoring periods (e.g., days, weeks, months, etc.). The SIHA 283 in an embodiment may access these indexed and classified JSON incidents to determine an amount of time required for each update or each version of each firmware or software application, or a percentage of CPU resources consumed during such updates. As described herein, the SIHA 283 may thus determine time or CPU resources used during previous updates to the same firmware or software at the first client information handling system 200 during a previous monitoring period. In another aspect, the SIHA 283 may also perform a similar determination for other client information handling systems (e.g., 270), to determine time or CPU resources used during previous updates to the same firmware or software at one or more other client information handling systems (e.g., 270) during one or more previous monitoring periods. In still another aspect, the SIHA 283 may also determine an average of time or CPU resources used during previous updates to the same firmware or software across a plurality of other client information handling systems (e.g., including 270) during one or more previous monitoring periods. The SIHA 283 in various embodiments may transmit such determined time or CPU resource use during previously performed updates to the adaptive $CO_2$ emissions reduction system 250 via the sustainability engine 281.

The adaptive $CO_2$ emissions reduction system 250 in an embodiment may determine a current power $CO_2$ emissions value describing the $CO_2$ emitted during generation of power consumed by various hardware components (e.g., 220, 241, 242, 243, 244, 245, 246, 247, 248, or 249) during the current monitoring period, based on power consumption tracked by the power analytics module 240 and upon the distributed power $CO_2$ emissions value received from the sustainability engine 281. For example, the client device adaptive $CO_2$ emissions reduction system 250 may determine a current power $CO_2$ emissions value of 1.02 pounds of $CO_2$ for the entire first client information handling system 200 by multiplying a total power consumed (e.g., 50 watts) by all hardware components (e.g., 220, 241, 242, 243, 244, 245, 246, 247, 248, or 249) of the first client information handling system 200 over the monitoring period by the duration of the monitoring period (e.g., 24 hours) and by the distributed power $CO_2$ emissions value (e.g., pounds $CO_2$/kWh). In other embodiments, the client device adaptive $CO_2$ emissions reduction system 250 may determine a current power $CO_2$ emissions value on a component-by-component basis. For example, the client device adaptive $CO_2$ emissions reduction system 250 may determine a current power $CO_2$ emissions value of 0.204 pounds of $CO_2$ for the memory 246 of the first client information handling system 200 by multiplying power consumed (e.g., 10 watts) by the memory 246 over the monitoring period by the duration of the monitoring period (e.g., 24 hours) and by the distributed power $CO_2$ emissions value (e.g., 0.85 pounds $CO_2$/kWh).

In some embodiments, the adaptive $CO_2$ emissions reduction system 250 may display the current power $CO_2$ emissions value due to hardware power consumption at the first information handling system 200 to a user via the GUI 290 or report this value to the enterprise management system 205. The user or an IT professional of the enterprise management system 205 in an embodiment may refer to this current power $CO_2$ emissions value to determine whether and how to decrease $CO_2$ emissions value associated with power consumption at the first client information handling system 200. For example, the user or an IT professional may choose to set a maximum $CO_2$ emissions value as a static number (e.g., one pound $CO_2$ per day) for the first client information handling system. As another example, the user or an IT professional may choose to decrease $CO_2$ emissions values systematically until an optimal maximum $CO_2$ emissions value is reached. More specifically, the user or an IT professional may select to decrease power consumption at the first client information handling system 200 by 10% each day until the first client information handling system 200 emits less than an optimal maximum $CO_2$ value (e.g., one pound $CO_2$ per day). In yet another example, an IT professional may set a maximum total $CO_2$ emissions across a plurality of client information handling systems (e.g., including 200 and 270) at a cumulative value (e.g., 1000 pounds $CO_2$ emissions) for an enterprise system. The user-specified maximum total $CO_2$ emissions (or other GHG emissions) may provide the basis for a maximum power draw threshold value described in greater detail below with respect to FIG. 4 at block 418. When power consumed at the client information handling system exceeds this maximum power draw threshold value, and thus causes GHG emissions at the client information handling system to exceed the user-specified maximum total $CO_2$ (or other GHG) emissions value, the power analytics module may notify the adaptive $CO_2$ emissions reduction system to initiate power conservation settings. In such way, the adaptive $CO_2$ emissions reduction system may adaptively initiate settings to conserve power in order to meet a user-specified maximum total $CO_2$ (or other GHG) emissions value.

The adaptive $CO_2$ emissions reduction system 250 in an embodiment may continuously monitor power consumption at the first client information handling system 200, as reported by the power analytics module 240, to identify when power is being consumed at higher rate than an average or expected value. For example, the power analytics module 240 in an embodiment may automatically notify the adaptive $CO_2$ emissions reduction system 250 when power consumption exceeds a maximum total power draw threshold value. Such a maximum power draw threshold value in an embodiment may be preset to a fixed value (e.g., 200 Watts/hour), set based on a received optimal $CO_2$ emissions value, or may be set based on previous consumption rates (e.g., 30% above average power consumed, as reported in previous JSON incidents over multiple previous monitoring periods). For example, in an embodiment in which the user or an IT professional has provided an optimal maximum $CO_2$ emissions value as described directly above, the adaptive $CO_2$ emissions reduction system 250 may determine the maximum power draw threshold value of 1.18 kW per hour by dividing the user-specified optimal maximum $CO_2$ emissions value (e.g., one pound $CO_2$) by the distributed power $CO_2$ emissions value (e.g., 0.85 pounds $CO_2$/kWh), as based on location.

In another embodiment, the maximum total power consumption threshold value may be adaptive, such that the power consumed, and GHGs emitted at the first information handling system 200 decrease consistently until a power conservation goal or $CO_2$ emission reduction goal has been reached. For example, the maximum total power consumption threshold value may decrease by some incremental value (e.g., 5%, 10%, 15%, etc.) on a daily, weekly, or monthly basis until a power conservation goal or $CO_2$ emission reduction goal has been achieved. More specifically, such a power conservation goal or CO2 emission reduction goal may require the power consumption at the first information handling system 200 to fall below a fixed value (e.g., 100 watts/hour), or may require total power consumption across a plurality of client information handling systems (e.g., including 200 and 270) to fall below a cumulative value (e.g., 1000 watts/hour) for an enterprise system. Thus, the power conservation goal or CO2 emission reduction goal may be set by a user of the first or second information handling systems (250 and 270), or by an IT professional operating at the enterprise management system 205, for example. The maximum power draw threshold value, as set by a user or IT professional, or determined by the adaptive CO2 emissions reduction system 250 based on user-specified CO2 emission reduction goals may be transmitted to the power analytics module 240.

The power analytics module 240 in an embodiment may continuously monitor the power consumed by various hardware components of the first information handling system 200 over time. If the power consumed at the first information handling system 200 in an embodiment exceeds the maximum power draw threshold value, as defined based on an optimal maximum CO2 emissions value or a CO2 emissions reduction goal specified by the user or an IT professional, for example, the power analytics module 240 may notify the adaptive CO2 emissions reduction system 250. Upon receipt of the notification that the power consumption has exceeded the maximum total power consumption threshold value in an embodiment, the adaptive CO2 emissions reduction system 250 may access one or more JSON incidents generated by the device index mapper 263 during the most recent monitoring period to determine hardware configurations currently in place that are optimized for performance, rather than power consumption. For example, the adaptive CO2 emissions reduction system 250 in an embodiment may search the indexed and classified JSON incident described above to identify the JSON event named "incident_class," having a value "config," indicating one or more hardware components may be configured for high performance rather than for low power consumption. Upon identification of the JSON incident classification under the configuration classifier, the adaptive CO2 emissions reduction system 250 in such an embodiment may further search the JSON incident to identify which hardware components are currently configured for high performance. For example, the adaptive CO2 emissions reduction system 250 in an embodiment may identify the JSON event named "NID_2_data_transceived," having a value of 100 GB, which may be above a preset high power transmission threshold value of 10 GB, to identify the WWAN interface device (e.g., 220) as currently configured for high performance (high data transmission), rather than low power consumption. As another example, the adaptive CO2 emissions reduction system 250 in an embodiment may identify the JSON event named "display_mode," having a value of "high_definition," to identify the display device 245 as currently configured for high performance (high definition display), rather than low power consumption. As still another example, the adaptive CO2 emissions reduction system 250 in an embodiment may identify the JSON event named "camera_detection_mode," having a value of "continuous_monitor," or the JSON event named "camera_capture_mode," having a value of "high_resolution," to identify the camera 248 as currently configured for high performance (continuous monitoring and high resolution image capture), rather than low power consumption.

In other embodiments, the adaptive CO2 emissions reduction system 250 may determine that the GPS unit 249 is currently set to continuous location determination, or determination of location at a relatively high frequency (e.g., once per minute). In still other embodiments, the adaptive CO2 emissions reduction system 250 may identify one or more software or firmware applications consuming a large proportion of CPU resources. For example, as described herein, the power analytics module 240 may determine current usage of processing resources by firmware or software applications as a percentage of total capacity for the processor 242 (e.g., central processing unit (CPU), graphics processing unit (GPU), or visual processing unit (VPU)). If a single firmware or software application is consuming a preset maximum processor utilization threshold value (e.g., 85%), the adaptive CO2 emissions reduction system 250 may determine that the processor 242 (e.g., CPU, GPU, VPU) is configured for high performance rather than low power consumption.

The adaptive CO2 emissions reduction system 250 at the first client information handling system 200 in an embodiment may recommend adjustments to hardware configurations or policy settings when current power consumption exceeds the maximum power draw threshold value, based on identification of one or more hardware components currently configured for high performance. For example, in an embodiment in which the adaptive CO2 emissions reduction system 250 determines the WWAN interface device or WLAN interface device (e.g., 220) is currently configured for high performance (high data transmission), rather than low power consumption, the adaptive CO2 emissions reduction system 250 may recommend to the user, via the GUI 290, that the user decrease power made available to the WWAN or WLAN interface device 220. In such an embodiment, the adaptive CO2 emissions reduction system 250 may suggest the power supplied to the network interface device 220 be reduced enough to bring the total power consumption at the first client information handling system 200 below the maximum power draw threshold value. In another embodiment, the adaptive CO2 emissions reduction system 250 may suggest, via GUI 290, that the user switch at least a portion of data transceiving tasks from the WWAN or WLAN interface device to a Bluetooth® network interface device, which requires less power for transmission than the WWAN or WLAN interface devices.

In another example, in an embodiment in which the adaptive CO2 emissions reduction system 250 determines the display device 245 is currently configured for high performance (high definition display), rather than low power consumption, the adaptive CO2 emissions reduction system 250 may recommend, via GUI 290, that the user adjust the policies for the display 245 to place the display in a standard definition mode or a low power mode. In yet another example, in an embodiment in which the adaptive CO2 emissions reduction system 250 determines the camera 248 is currently configured for high performance (continuous monitoring or high resolution image capture), rather than low power consumption, the adaptive CO2 emissions reduction system 250 may recommend, via GUI 290, that the user adjust the policies for the camera 248 to turn off continuous monitoring or decrease image capture resolution.

In yet another example, in an embodiment in which the adaptive CO2 emissions reduction system 250 may determine that the GPS unit 249 is currently set to continuous location determination, or determination of location at a relatively high frequency (e.g., once per minute), the adaptive CO2 emissions reduction system 250 may recommend turning off location services or limiting determination of location (e.g., to once per hour). In yet another example, the adaptive CO2 emissions reduction system 250 may recommend termination of software or firmware applications identified as consuming a large proportion of CPU 242 resources, or limiting processor resources made available to those processes. In some embodiments, the adaptive CO2 emissions reduction system 250 may receive prompts from the user, via GUI 290, to initiate the recommended policy changes and may instruct the power analytics module 240 to initiate those changes. In such a way, the adaptive CO2 emissions reduction system may monitor power consumption at a client information handling system and adaptively recommend adjustments to policies and configurations for hardware in order to decrease power usage during high power consumption periods. Such a decrease in power usage in an embodiment may allow the client information handling system 200 to meet or stay below an optimal maximum CO2 emissions value or meet a CO2 emissions reduction goal specified by the user or an IT professional, for example.

In another aspect of an embodiments, the adaptive CO2 emissions reduction system may adaptively adjust methods of software or firmware updating in order to decrease power usage during high power consumption periods, based on recommendations received from the sustainability engine 281. As described above, the sustainability engine 281 in an embodiment may operate to routinely gather indexed and classified JSON incidents from client device adaptive CO2 emissions reduction systems (e.g., 250 and 271) for later analysis by the Systems Internal Health Assessor (SIHA) 283 or the adaptive CO2 emissions reduction system 250. If the adaptive CO2 emissions reduction system 250 in an embodiment does not identify a hardware configuration for high-performance that may be adjusted to decrease power consumption, the adaptive CO2 emissions reduction system 250 may transmit an indication of high-power consumption at the first client information handling system 200 to the SIHA 283 via the sustainability engine 281.

The SIHA 283 in an embodiment may search telemetry 282 data to identify indications within the indexed and classified JSON incidents of inefficient or unnecessary firmware or software updates and poor driver performance. For example, the SIHA 283 in an embodiment may search the indexed and classified JSON incident described above, which has been transmitted to the sustainability engine 281 and stored in telemetry 282 to identify the JSON event named "incident_class," having a value "driver_perf," indicating poor driver performance. Upon identification of the JSON incident classification under the poor driver performance classifier, the SIHA 283 in such an embodiment may further search the JSON incident to identify the underperforming driver and its current version. For example, the SIHA 283 in an embodiment may identify the JSON event named "unsuccessful_driver_install_attempts," having a value of "display_driver_14.3," or the JSON event named "device_driver_call_failure_rate," having a value of 0.55, which may be above a preset maximum driver call failure rate of 50%. Either of these JSON events so identified by the SIH 283 in an embodiment may indicate that the display device driver is the underperforming driver that caused the JSON incident to be classified under the driver performance classification. In such an embodiment, the SIHA 283 may reference the JSON event "display driver version," having a value of 14.2 to identify that version 14.2 of the display driver is currently operating at the first client information handling system 200.

When the SIHA 283 has identified a specific driver and a specific version of that driver causing high power consumption, the SIHA 283 may communicate with an update service 286 to determine whether the identified driver is the most current version, or whether the most recent update to the driver requires receipt and storage of obsolete or redundant files. As described herein, the UEM platform 280 and enterprise management system 205 in an embodiment may operate as a cloud-based service in communication with the enterprise management system 205 via a network to identify information technology (IT) issues at a first client information handling system 200, or a second client information handling system 270. The UEM platform 280 may also provide support for such issues, including automatically updating drivers or hardware components, as needed. The update service 286 in an embodiment may, for each of the plurality of client information handling systems (e.g., 200 and 270) schedule and facilitate routine updates, track usage of various files within each update version, and track the time required across a plurality of client information handling systems (e.g., 200 and 270) for installation of such updates and files. The SIHA 283 in an embodiment in which a specific version of a specific driver is known to be causing high power consumption may retrieve information from the update service 286 to identify the most current version of the driver and any redundant or obsolete files that may have been installed at the first client information handling system 200 during previous updates to that driver.

The SIHA 283 may also retrieve an estimated installation time for the most current version of the driver in an embodiment. If the driver underperformance in an embodiment is due to improper or failed installation of the most recent update, the time to install that update at the first client information handling system 200 may be significantly longer than the estimated or average time for successful installation of that update at other client information handling systems (e.g., 270), for example. The SIHA 283 may transmit the identification of the most current driver version, any redundant or obsolete files that may have been installed at the first client information handling system 200 during previous updates, and the average or estimated installation time for the most recent update to the first client information handling system 200 via the sustainability engine 281 in an embodiment.

The adaptive CO2 emissions reduction system 250 in an embodiment may make recommendations for execution of firmware or updating of firmware or software applications, based on the information received from the SIHA 283, as described directly above. For example, in an embodiment in which the estimated or average time for successful installation of an update of firmware or software applications is less than the time consumed during one or more previous installation attempts at the first information handling system 200, the adaptive CO2 emissions reduction system 250 may recommend, via the GUI 290, that the user pause any repeated attempts at unsuccessful installation of the driver or software application associated with that elongated installation time. In another example, the adaptive CO2 emissions reduction system 250 may reference the indexed and classified JSON incident above to identify the JSON event named "unsuccessful_driver_install_attempts," having a value of "display_driver_14.3," indicating a failed attempt at installing the display driver version 14.3. In such a scenario, the adaptive CO2 emissions reduction system 250 may recommend that the user pause or terminate future attempts at installing the display driver version 14.3. Such a repeated failure may indicate a flaw in the driver installation package itself, and may require downloading of the most updated driver installation package, as described directly below.

In yet another example, the adaptive CO2 emissions reduction system 250 may recommend, via the GUI 290, that the user download the most recently updated drivers and delete non-optimized drivers or software applications. For example, the adaptive CO2 emissions reduction system 250 may reference the indexed and classified JSON incident above to identify the JSON event named "device_driver_call_failure_rate," having a value of 0.55, which may be above a preset maximum driver call failure rate of 50%. In such an example embodiment, the adaptive CO2 emissions reduction system 250 may recommend that the user download the most recent version of that driver, as identified by the SIHA 283. The adaptive CO2 emissions reduction system 250 in such an embodiment may further recommend deletion of previous versions of the driver that may interfere with proper execution of the most recent version of the driver. As another example, the adaptive CO2 emissions reduction system in an embodiment may recommend the user delete any obsolete or redundant files associated with the underperforming driver or software application, as identified by the SIHA 283. In some embodiments, the adaptive CO2 emissions reduction system 250 may receive prompts from the user, via GUI 290, to initiate the recommended changes to firmware execution or updates to firmware or software and may instruct the power analytics module 240 or the analytics module 230 to initiate those changes. In such a way, the adaptive CO2 emissions reduction system may monitor power consumption at a client information handling system and adaptively recommend adjustments to execution of firmware or updates to firmware or software in order to decrease power usage during high power consumption periods. Such a decrease in power usage in an embodiment may allow the client information handling system 200 to meet or maintain below an optimal maximum CO2 emissions value or meet a CO2 emissions reduction goal specified by the user or an IT professional, for example.

Figure 3:
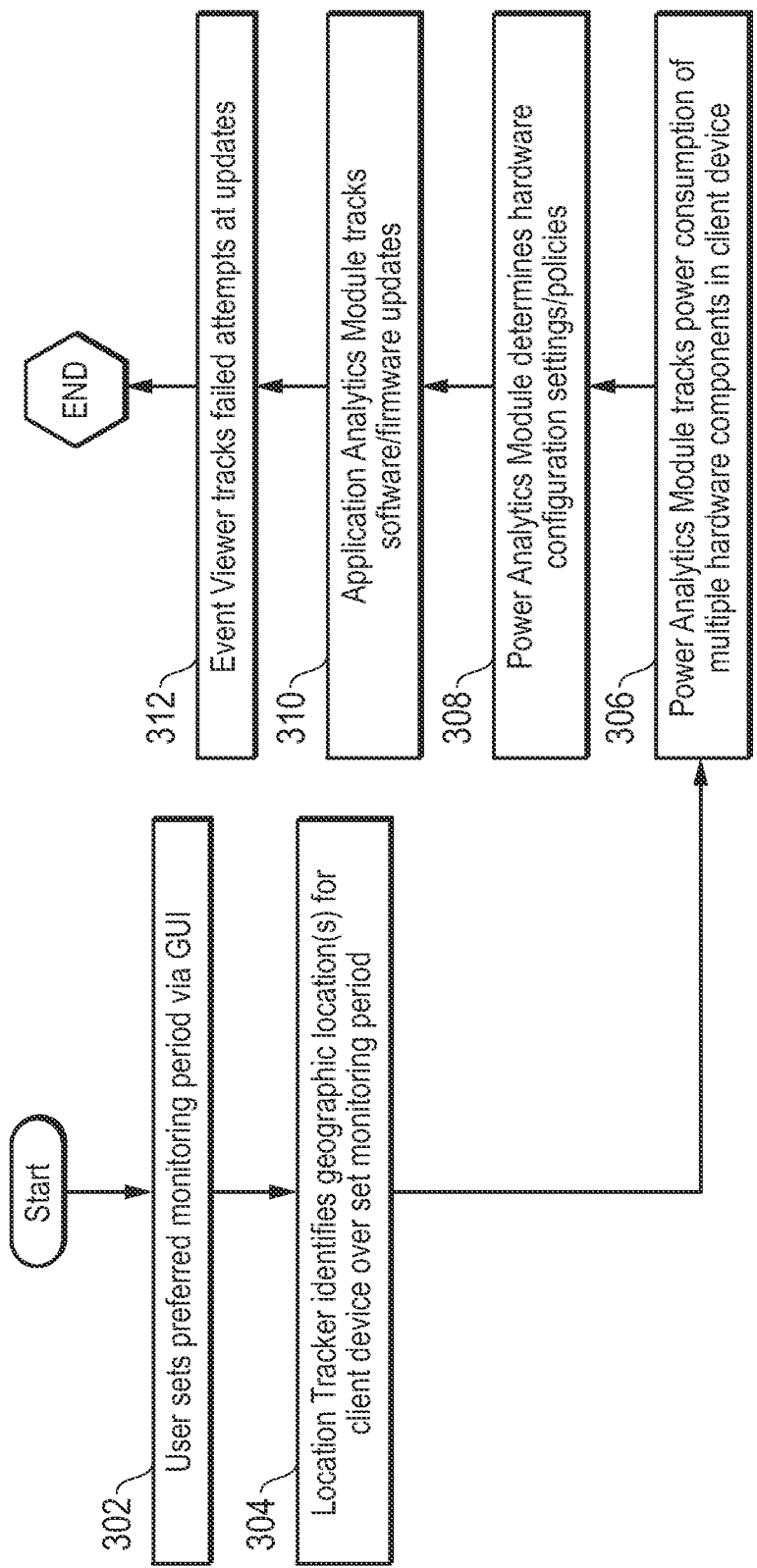
FIG. 3 is a flow diagram illustrating a method of gathering power and application analytics according to an embodiment of the present disclosure.

FIG. 3 is a flow diagram illustrating a method of gathering power and application analytics for determination of carbon emissions for a client information handling system drawing power to operate various hardware components during a monitoring period according to an embodiment of the present disclosure. As described herein, the adaptive CO2 emissions reduction system in an embodiment may determine an amount of greenhouse gas emissions that may be attributable to usage at an information handling system of hardware systems, power usage, and firmware updates.

At block 302, a user of the client information handling system in an embodiment may set a preferred monitoring period for tracking CO2 emissions due to use of applications and power at the information handling system. For example, in an embodiment described with reference to FIG. 2, the data collector 261 in an embodiment may gather data regarding hardware configuration and power consumption from the power analytics module 240 and data regarding software performance and processor usage from the application analytics module 230 at preset intervals. For example, such a preset interval may be set to a default monitoring period value (e.g., one hour, one day, one week), or may be set by the user of the first client information handling system 200 via the graphical user interface (GUI) 290.

A location tracking in an embodiment may identify a geographic location for the client information handling system over the user-specified monitoring period at block 304. For example, the location sensing unit 249 in an embodiment may determine a geographic location (e.g., zip code, GPS coordinates, city, state, country) in which the first client information handling system 200 is operating. The location of the first client information handling system 200 may be tracked by a GPS tracking sensor, Wi-Fi, or LTE location systems, or other location sensing systems in various embodiments. As described herein, the GHGs emitted due to consumption of power in an embodiment may vary based on such a geographic location due to variance in GHG emissions by power suppliers in various geographic locations and the fuel used to generate such power. The geographic location in an embodiment may be determined simultaneously with consumption of A/C power (e.g., via a wall outlet). In cases where the information handling system operates on battery power during operation of hardware components, the location tracked at block 304 may be the location at which the battery was charged, rather than the location at which the hardware components consumed the battery power.

At block 306, the power analytics module may track power consumption of multiple hardware components in the client information handling system in an embodiment. For example, the power analytics module 240 in an embodiment may monitor power consumption by each of the various hardware components (e.g., 220, 241, 242, 243, 244, 245, 246, 247, 248, or 249) in an embodiment. In some embodiments, such hardware power consumption may be attributed to specific software applications. For example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In still another example, the power analytics module may determine current usage of memory resources by software applications as a percentage of total capacity for memory 246, time required to process requests to access such memory 246, and identify software applications most frequently accessing such memory 246. In yet another example, the power analytics module 240 in an embodiment may determine a current usage of the display by software applications as a percentage of display time in which GUI for a specific software application is visible, and a usage mode for the display 245, such as day mode, night mode, power reserve mode, or gaming mode (e.g., high-resolution). In another example, the power analytics module 240 in an embodiment may determine current usage of network interface device resources by software applications as a percentage of total capacity for the network interface device 220 to transceive data (e.g., percentage of total available throughput used). All information accessed in such a way by the power analytics module 240 in an embodiment may be communicated to the data collector 261.

The power analytics module in an embodiment may determine hardware configurations, settings, or policies at block 308. For example, the power analytics module 240 may access firmware for hardware components (e.g., 220, 241, 242, 243, 244, 245, 246, 247, 248, or 249) to determine policies or settings for those components at the time of power measurements made at block 306. More specifically, the power analytics module 240 in an embodiment may determine whether a network interface device 220 is transceiving according to WLAN, WWAN, Bluetooth®, or Near Field Communication (NFC) standards, as well as policies setting a preference for one type of standard over another, or restrictions on power consumption, data rate, or frequencies used by the network interface device 220. In another example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In yet another example, the power analytics module 240 in an embodiment may determine a current usage mode for the display 245, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the fingerprint detector 243, motion detector 247, location sensing device (e.g., GPS unit) 249, or camera 248 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 248, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

At block 310, the application analytics module may track software or firmware updates in an embodiment. For example, in an embodiment, the application analytics module 230 may monitor execution of software applications within the operating system (OS) for the first client information handling system 200. The application analytics module 230 in an embodiment may further track which software applications are running or idle (e.g., executing in the background) at various times, track CPU utilization, and track current versions of software applications and times at which updates to such software applications are performed. All information accessed in such a way by the application analytics module 230 in an embodiment may be communicated to the data collector 261.

The event viewer may track failed attempts at firmware or software updates in an embodiment at block 312. For example, the data collector 261 may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error, a failed attempt at firmware or software updating, or an unusually high consumption of power by hardware components, or identifying the driver or software application associated with a failed update. Such WHEA events may be associated with data packets that specifically identify the hardware component (e.g., 220, 241, 242, 243, 244, 245, 246, 247, 248, or 249) producing the error or consuming the unusually high power levels. The method for gathering power and application analytics for determination of carbon emissions for a client information handling system drawing power to operate various hardware components during a current monitoring period may then end.

Figure 4:
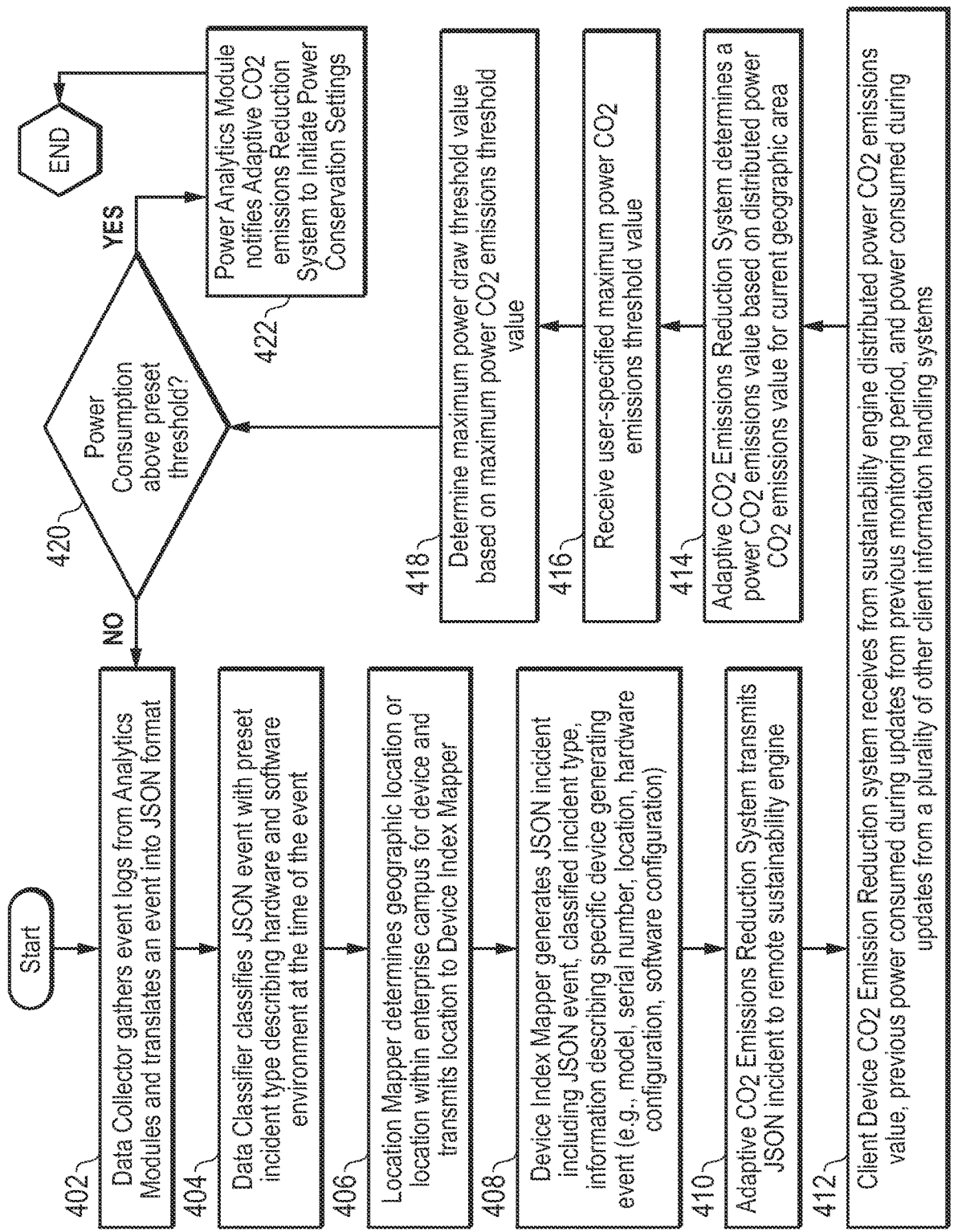
FIG. 4 is a flow diagram illustrating a method of monitoring power consumption at a client information handling system according to an embodiment of the present disclosure.

FIG. 4 is a flow diagram illustrating a method of monitoring power consumption at a client information handling system to decrease or limit associated carbon dioxide ($CO_2$) emissions according to an embodiment of the present disclosure. As described herein, the adaptive $CO_2$ emissions reduction system may monitor power consumption in order to decrease power usage during high power consumption periods and corresponding $CO_2$ emissions at a client information handling system.

At block 402, a data collector of a client information handling system in an embodiment may gather event log data, or reports from analytics engines such as hardware analytics applications or software analytics applications, and translate these logs or reports into a predetermined data interchange format such as JavaScript Object Notation (JSON), Extensive Markup Language (XML), or Yet Another Markup Language (YAML). Any format may be used, but JSON is discussed herein by way of an example embodiment. For example, in an embodiment described with reference to FIG. 2, above, the data collector 261 may gather reports from the power analytics module 240 and the application analytics module 230 and event logs from the event viewer 265. The data collector 261 in such an embodiment may further translate these reports and logs into JSON incidents for later parsing, searching, and editing by various components of the first client information handling system 200 and the Unified Endpoint Management (UEM) platform 280. For example, the data collector 261 may generate the following JSON incident based on the information gathered and stored in Table 1, above:

```
{
  "data" :
  {
    "incident_id" : 456789,
    "source_ID" : power_analytics_module,
    "timestamp_unixtime_ms" : 1544145336,
    "custom_flags" :
    {
      "Unsuccessful_driver_install_attempts" : display_driver_14.3,
      "Device_Driver_Call_Failure_Rate" : 0.55
    }
    "device_current_state" :
    {
      "NID_1_type" : WLAN,
      "NID_2_type" : WWAN,
      "NID_2_data_transceived" : 100 GB,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "Display_driver_version" : 14.2,
      "Display_mode" : high_definition,
      "Camera_type" : webcam,
      "Camera_detection_mode" : continuous_monitor,
      "Camera_capture_mode" : high_resolution,
      "OS_Version" : 10.2,
      "Video_Conference_App" : Active,
      "Gaming_App" : Active,
      "Code_Compiling_App" : Background,
    }
  }
}
```

The data classifier in an embodiment may classify objects within the gathered JSON event with preset incident types describing heat measurements, hardware component failures, or software application execution and usage for the client information handling system at the time of the event at block 404. For example, the data classifier 262 in an embodiment may edit the JSON incident created at block 402 by adding an incident classifier. More specifically, the data classifier 262 in an embodiment may analyze the JSON incident generated at block 402 to identify whether any of the JSON events and values associated with preset incident classifiers appear within the JSON incident.

For example, the data classifier 262 in an embodiment may determine the JSON incident described above includes the JSON event named "unsuccessful_driver_install_attempts," having a value of "display_driver_14.3," indicating a failed attempt at installing an updated display driver. In such an example embodiment, the data classifier 262 may classify the JSON incident described above as "driver_perf," indicating underperformance of a driver. As another example, the data classifier 262 in an embodiment may determine the JSON incident described above includes the JSON event named "device_driver_call_failure_rate," having a value of 0.55, which may be above a preset maximum driver call failure rate of 50%, indicating a failed attempt at installing an updated display driver. In such an example embodiment, the data classifier 262 may classify the JSON incident described above as "driver_perf," indicating underperformance of a driver.

In still another example, the data classifier 262 in an embodiment may determine the JSON incident described above includes the JSON event named "NID_2_data_transceived," having a value of 100 GB, which may be above a preset high power transmission threshold value of 10 GB, indicating a high power gain on the WWAN interface device. In such an example embodiment, the data classifier 262 may classify the JSON incident described above as "config," indicating the WWAN interface device is configured for high performance, rather than power conservation. In yet another example, the data classifier 262 in an embodiment may determine the JSON incident described above includes the JSON event named "display_mode," having a value of "high definition," indicating the display is set to display video in high definition. In such an example embodiment, the data classifier 262 may classify the JSON incident described above as "config," indicating the display device is configured for high performance, rather than power conservation. In still another example, the data classifier 262 in an embodiment may determine the JSON incident described above includes the JSON event named "camera_detection_mode," having a value of "continuous_monitor," indicating the camera is set to continuously monitor the surrounding area of the first client information handling system 200. In such an example embodiment, the data classifier 262 may classify the JSON incident described above as "config," indicating the camera is configured for high performance, rather than power conservation. As yet another example, the data classifier 262 in an embodiment may determine the JSON incident described above includes the JSON event named "camera_capture_mode," having a value of "high_resolution," indicating the camera is set to capture images in at a high resolution. In such an example embodiment, the data classifier 262 may classify the JSON incident described above as "config," indicating the camera is configured for high performance, rather than power conservation.

The data classifier 262 in an embodiment may apply such a classification by editing the JSON incident received from the data collector 261 to generate a classified JSON incident that includes the following incident classification(s), in addition to the JSON events described above, within the JSON incident:

```
{
    "incident_class" : Workload,
    "incident_class" : Driver_perf,
}
```

At block 406, a location mapper of the client information handling system may determine a geographic location or location within an enterprise campus for the client information handling system and transmit the location to the device index mapper in an embodiment. For example, the device index mapper 263 may retrieve a location for the first client information handling system 200 from the GPS unit 249. The geographic location in an embodiment may be determined simultaneously with consumption of A/C power (e.g., via a wall outlet). In cases where the information handling system operates on battery power during operation of hardware components, the location tracked at block 406 may be the location at which the battery was charged, rather than the location at which the hardware components consumed the battery power.

The device index mapper in an embodiment may generate a JSON incident including one or more JSON events and classified incident types at block 408. For example, the device index mapper 263 in an embodiment may associate the classified JSON incident with a device ID and device model for the first client information handling system 200. Such a device ID in an embodiment may be one of several device IDs for a plurality of information handling systems (e.g., including the first and second client information handling systems 200 and 270) stored at the UEM platform 280. The device index mapper 263 in an embodiment may then edit the classified JSON incident to generate an indexed and classified JSON incident that includes this information:

```
{
  "data" :
  {
    "incident_id" : 456789,
    "source_ID" : power_analytics_module,
    "timestamp_unixtime_ms" : 1544145336,
    "custom_flags" :
      {
        "Unsuccessful_driver_install_attempts" :
        display_driver_14.3,
        "Device_Driver_Call_Failure_Rate" : 0.55
      }
    "device_current_state" :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2,
        "Video_Conference_App" : Active,
        "Gaming_App" : Active,
        "Code_Compiling_App" : Background,
```

```
        }
    }
{
    "incident_class" : Workload
    "incident_class" : Driver_perf,
}
```

At block 410, a recommendation agent of the client information handling system may transmit the JSON incident generated at block 408 to a remote sustainability engine of the UEM platform in an embodiment. For example, the adaptive $CO_2$ emissions reduction system 250 of the first client information handling system 200 in an embodiment described with reference to FIG. 2 may transmit the above indexed and classified JSON incident to the sustainability engine 281 operating at the UEM platform 280. An adaptive $CO_2$ emissions reduction system 271 operating at a second client information handling system 270 may also transmit similar telemetries, indicating power usage at the second information handling system 270. As described in an embodiment with reference to FIG. 1, the UEM platform in an embodiment may operate as a cloud-based service to store data (e.g., operating environment telemetries for remote client information handling systems 100) within memory 102, static memory 103, or computer readable medium 186 received via network 170.

The client device adaptive $CO_2$ emissions reduction system in an embodiment may receive from the sustainability engine at block 412 a distributed power $CO_2$ emissions value, a measure of power previously consumed during prior updates in prior monitoring periods, or a measure of average power previously consumed during prior updates at other client information handling systems. For example, in an embodiment described with reference to FIG. 2, upon receipt of the telemetry identifying the location of the first client information handling system 200 in an embodiment, the sustainability engine 281 may retrieve a distributed power $CO_2$ emissions value for the geographic location of the first client information handling system from the $CO_2$ optimization engine 285. Such a distributed power $CO_2$ emissions value may describe the amount of GHG emitted during the generation of a single unit of power (e.g., one kWh) by a power plant known to supply power within the geographic region including the location of the first information handling system 200. The sustainability engine 281 in an embodiment may transmit this distributed power $CO_2$ emissions value for the geographic location of the first information handling system 200 to the adaptive $CO_2$ emissions reduction system 250.

The sustainability engine 281 in another aspect of an embodiment may also transmit information the adaptive $CO_2$ emissions reduction system may use to compare efficiency of software or firmware updates at a first client information handling system during a current monitoring period to efficiency of updates for the same firmware or software at the first client information handling system or at other client information handling systems during previous monitoring periods. For example, SIHA 283 may determine time or CPU resources used during previous updates to the same firmware or software at the first client information handling system 200 during a previous monitoring period. In another aspect, the SIHA 283 may also perform a similar determination for other client information handling systems (e.g., 270), to determine time or CPU resources used during previous updates to the same firmware or software at one or more other client information handling systems (e.g., 270) during one or more previous monitoring periods. In still another aspect, the SIHA 283 may also determine an average of time or CPU resources used during previous updates to the same firmware or software across a plurality of other client information handling systems (e.g., including 270) during one or more previous monitoring periods. The SIHA 283 in various embodiments may transmit such determined time or CPU resource use during previously performed updates to the adaptive $CO_2$ emissions reduction system 250 via the sustainability engine 281.

The adaptive $CO_2$ emissions reduction system in an embodiment may determine a power $CO_2$ emissions value at block 414 due to power consumption based on tracked power consumption and the distributed power $CO_2$ emissions value received at block 408. For example, the client device adaptive $CO_2$ emissions reduction system 250 may determine a current power $CO_2$ emissions value of 1.02 pounds of $CO_2$ for the entire first client information handling system 200 by multiplying a total power consumed (e.g., 50 watts) by all hardware components (e.g., 220, 241, 242, 243, 244, 245, 246, 247, 248, or 249) of the first client information handling system 200 over the monitoring period by the duration of the monitoring period (e.g., 24 hours) and by the distributed power $CO_2$ emissions value (e.g., 0.85 pounds $CO_2$/kWh). As another example, the client device adaptive $CO_2$ emissions reduction system 250 may determine a current power $CO_2$ emissions value of 0.204 pounds of $CO_2$ for the memory 246 of the first client information handling system 200 by multiplying power consumed (e.g., 10 watts) by the memory 246 over the monitoring period by the duration of the monitoring period (e.g., 24 hours) and by the distributed power $CO_2$ emissions value (e.g., 0.85 pounds $CO_2$/kWh).

The adaptive $CO_2$ emissions reduction system in an embodiment may receive a user-specified maximum power $CO_2$ emissions threshold value via a graphical user interface (GUI) at block 416. For example, the user or an IT professional may choose to set a maximum $CO_2$ emissions value as a static number (e.g., one pound $CO_2$ per day) for the first client information handling system. As another example, the user or an IT professional may choose to decrease $CO_2$ emissions values systematically until an optimal $CO_2$ emissions value is reached. More specifically, the user or an IT professional may select to decrease power consumption at the first client information handling system 200 by 10% each day until the first client information handling system 200 emits less than an optimal $CO_2$ value (e.g., one pound $CO_2$ per day). In yet another example, an IT professional may set a maximum total $CO_2$ emissions across a plurality of client information handling systems (e.g., including 200 and 270) at a cumulative value (e.g., 1000 pounds $CO_2$ emissions) for an enterprise system.

At block 418, the adaptive $CO_2$ emissions reduction system in an embodiment may determine a maximum power draw threshold value based on the maximum power $CO_2$ emissions threshold value specified at block 416, and notify the power analytics module of such a maximum power draw threshold value. The user-specified maximum total $CO_2$ emissions (or other GHG emissions) may provide the basis for the maximum power draw threshold value in some embodiments. In an embodiment in which the user or an IT professional has provided an optimal $CO_2$ emissions value as described directly above at block 416, the adaptive $CO_2$ emissions reduction system 250 may determine the maximum power draw threshold value of 1.18 kW per hour by dividing the optimal $CO_2$ emissions value (e.g., one pound CO2) by the distributed power CO2 emissions value (e.g., 0.85 pounds CO2/kWh). As another example, the maximum total power consumption threshold value may decrease by some incremental value (e.g., 5%, 10%, 15%, etc.) on a daily, weekly, or monthly basis until a power conservation goal has been achieved, based on a user-specified CO2 emissions reduction goal. In other embodiments, a maximum power draw threshold value in an embodiment may be preset to a fixed value (e.g., 200 Watts/hour), or may be set based on previous consumption rates (e.g., 30% above average power consumed, as reported in previous JSON incidents over multiple previous monitoring periods). More specifically, such power conservation goals may require the power consumption at the first information handling system 200 to fall below a fixed value (e.g., 100 watts/hour), or may require total power consumption across a plurality of client information handling systems (e.g., including 200 and 270) to fall below a cumulative value (e.g., 1000 watts/hour) for an enterprise system in order to meet a power conservation goal or a user-specified optimal maximum CO2 emissions value, or a user-specified CO2 emissions reduction goal.

In embodiments in which the maximum power draw threshold depends upon a user-specified CO2 emissions reduction goal, or user-specified optimal maximum CO2 emissions value, the maximum power draw threshold may vary with location of the client information handling system 200 or the location at which the battery for the client information handling system 200 is charged. For example, the maximum power draw threshold value in one such an embodiment may be determined by dividing the user-specified optimal maximum CO2 emissions value by the distributed power CO2 emissions value determined for the location at which the first client information handling system 200 directly consumed A/C power (e.g., via a wall socket), or the location at which the first client information handling system 200 battery was last charged, if the hardware components are consuming battery power. In another example, an incremental decrease in maximum power draw threshold value in another such embodiment may be determined by dividing the user-specified CO2 reduction goal (which may incrementally decrease over time) by the distributed power CO2 emissions value determined for the location at which the first client information handling system 200 directly consumed A/C power (e.g., via a wall socket), or the location at which the first client information handling system 200 battery was last charged, if the hardware components are consuming battery power. In both such embodiments, the maximum power draw threshold value may thus depend upon the location at which the client information handling system 200 directly consumes power via an A/C wall outlet or charges its battery for later power consumption. In other words, the user of a client information handling system may increase the maximum power draw threshold value, thus forestalling initiation of power conservation settings in an embodiment by charging or plugging the client information handling system into a cleaner energy source, such as a power plant or power source generating energy without the burning of fossil fuels.

The power analytics module in an embodiment may determine at block 420 whether current power consumption is above the maximum power draw threshold value. For example, the maximum power draw threshold value, as set by a user or IT professional, or determined by the adaptive CO2 emissions reduction system 250 may be transmitted to the power analytics module 240. The power analytics module 240 in an embodiment may continuously monitor the power consumed by various hardware components of the first information handling system 200 over time. If the current power consumption at the client information handling system is above the maximum power draw threshold value, the method may proceed to block 422 for institution of a power conservation setting. If the current power consumption at the client information handling system is at or below the maximum power draw threshold value, the method may proceed back to block 402. By repeating the loop between 402 and 420, the adaptive CO2 emissions reduction system may routinely gather telemetry data needed to continuously monitor and limit carbon dioxide emissions due to power consumption at the client information handling system.

At block 422, in an embodiment in which the current power consumption at the client information handling system is above the maximum power draw threshold value, the power analytics module may notify the adaptive CO2 emissions reduction system to initiate a power conservation setting. As described herein, the user-specified maximum total CO2 emissions (or other GHG emissions) may provide the basis for the maximum power draw threshold value in an embodiment. When power consumed at the client information handling system exceeds this maximum power draw threshold value, and thus causes GHG emissions at the client information handling system to exceed the user-specified maximum total CO2 (or other GHG) emissions value, the power analytics module may notify the adaptive CO2 emissions reduction system to initiate power conservation settings. In such way, the adaptive CO2 emissions reduction system may adaptively initiate settings to conserve power in order to meet a user-specified maximum total CO2 (or other GHG) emissions value.

In an embodiment in which the power consumed at the first information handling system 200 in an embodiment exceeds the maximum power draw threshold value, the power analytics module 240 may notify the adaptive CO2 emissions reduction system 250 to initiate power conservation settings, as described in greater detail below with respect to FIG. 5. A decrease in power usage resulting from such power conservation settings in an embodiment may allow the client information handling system 200 to meet an optimal maximum CO2 emissions value or a CO2 emissions reduction goal specified by the user or an IT professional, for example. In such a way, the adaptive CO2 emissions reduction system may monitor power consumption in order to decrease power usage during high power consumption periods and corresponding CO2 emissions at a client information handling system. The method for monitoring power consumption at a client information handling system to decrease or limit associated carbon dioxide (CO2) emissions may then end.

Figure 5:
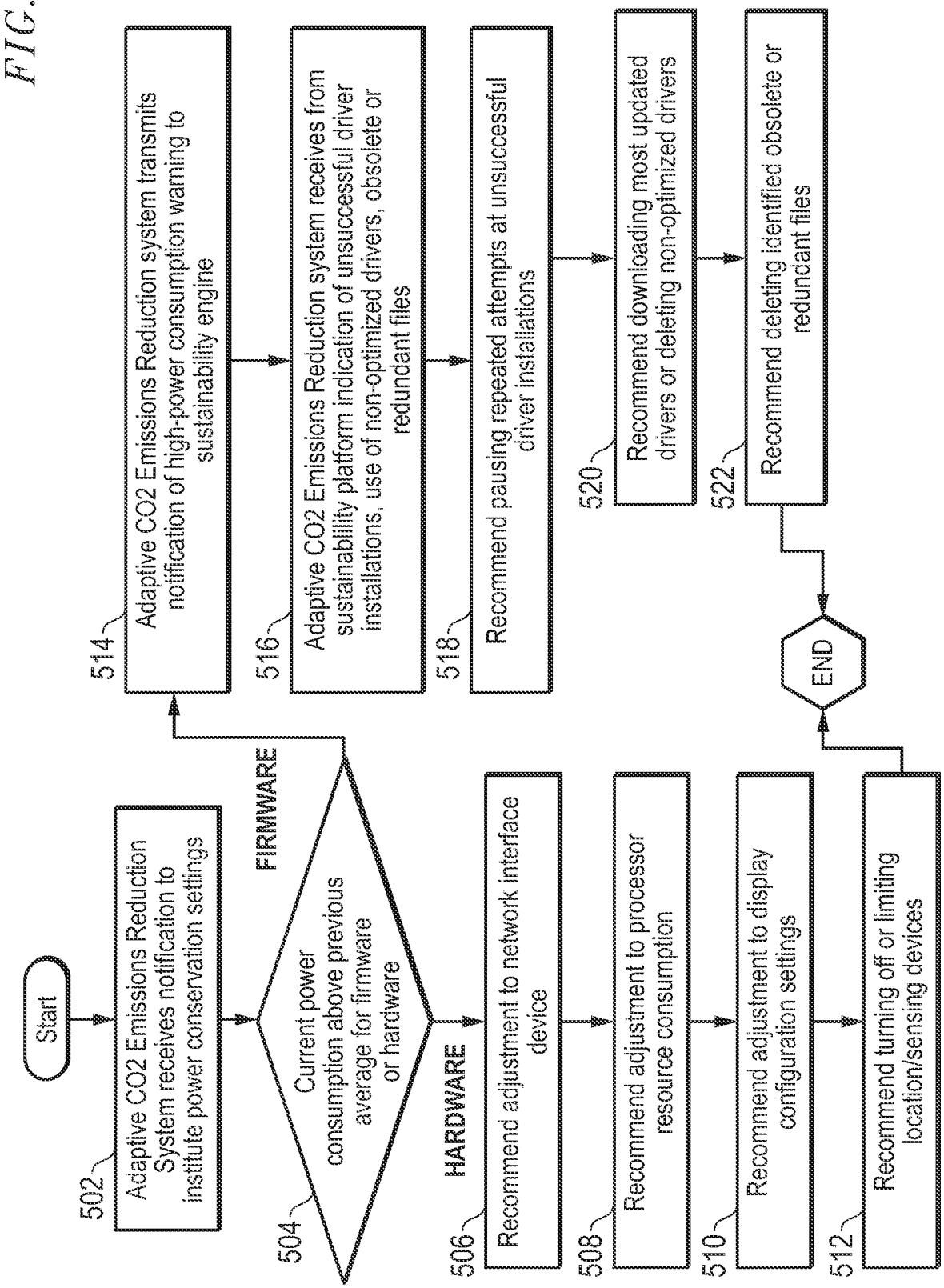
FIG. 5 is a flow diagram illustrating a method of adaptively adjusting policies and configurations for hardware or firmware or methods of updating software or firmware according to an embodiment of the present disclosure.

FIG. 5 is a flow diagram illustrating a method of adaptively adjusting policies and configurations for hardware or firmware and including, optionally, methods of updating software or firmware to decrease power usage during high power consumption periods according to an embodiment of the present disclosure. As described herein, the adaptive CO2 emissions reduction system in an embodiment may track an amount of greenhouse gas emissions that may be attributable to power consumption at an information handling system over time, and make recommendations for hardware and firmware usage or updating of software or firmware that may reduce such emissions.

At block 502, the adaptive CO2 emissions reduction system in an embodiment may receive a notification to institute power conservation settings. For example, in an embodiment described with respect to FIG. 2, the adaptive CO2 emissions reduction system 250 may receive a notification to institute power conservation settings from the power analytics module 240 when power consumed at the first information handling system 200 exceeds a preset maximum power draw threshold value, as described above with reference to block 422 of FIG. 4. As described herein, the maximum power draw threshold value in an embodiment may be set according to user or IT professional input for decreasing or limiting CO2 emissions for the first information handling system 200 or across a plurality of information handling systems (e.g., including 200 and 270) of an enterprise management system.

The adaptive CO2 emissions reduction system 250 in an embodiment may determine at block 504 whether the cause of the current power consumption exceeding the maximum power draw threshold value is due to operation of hardware, execution of firmware, or updating of firmware or software. Upon receipt of the notification that the power consumption has exceeded the maximum total power consumption threshold value in an embodiment, the adaptive CO2 emissions reduction system 250 may access one or more JSON incidents generated by the device index mapper 263 during the most recent monitoring period to determine hardware configurations currently in place that are optimized for performance, rather than power consumption. This may indicate that a hardware configuration may be the cause of the current high-power consumption rate. In the absence of identification of a high-performance hardware setting, the adaptive CO2 emissions reduction system may communicate with the SIHA 283 to determine a possible cause of the high consumption rate by firmware execution or updating of software or firmware.

The adaptive CO2 emissions reduction system 250 in an example embodiment may search the indexed and classified JSON incident described above to determine hardware configurations currently in place that are optimized for performance, rather than power consumption. For example, the adaptive CO2 emissions reduction system 250 may identify the JSON event named "incident_class," having a value "config," indicating one or more hardware components may be configured for high performance rather than for low power consumption. Upon identification of the JSON incident classification under the configuration classifier, the adaptive CO2 emissions reduction system 250 in such an embodiment may further search the JSON incident to identify which hardware components are currently configured for high performance. For example, the adaptive CO2 emissions reduction system 250 in an embodiment may identify the JSON event named "NID_2_data_transceived," having a value of 100 GB, which may be above a preset high power transmission threshold value of 10 GB, to identify the WWAN interface device (e.g., 220) as currently configured for high performance (high data transmission), rather than low power consumption. As another example, the adaptive CO2 emissions reduction system 250 in an embodiment may identify the JSON event named "display_mode," having a value of "high_definition," to identify the display device 245 as currently configured for high performance (high definition display), rather than low power consumption. As still another example, the adaptive CO2 emissions reduction system 250 in an embodiment may identify the JSON event named "camera_detection_mode," having a value of "continuous_monitor," or the JSON event named "camera_capture_mode," having a value of "high_resolution," to identify the camera 248 as currently configured for high performance (continuous monitoring and high resolution image capture), rather than low power consumption.

In another example, the adaptive CO2 emissions reduction system 250 may determine that the GPS unit 249 is currently set to continuous location determination, or determination of location at a relatively high frequency (e.g., once per minute). In yet another example, the adaptive CO2 emissions reduction system 250 may identify one or more software or firmware applications consuming a large proportion of CPU resources. If the adaptive CO2 emissions reduction system in an embodiment determines that operation of hardware is causing the current power consumption to exceed the maximum power draw threshold value, the method may proceed to block 506 for reconfiguration of one or more hardware components. If the adaptive CO2 emissions reduction system in an embodiment determines that execution of firmware or updating of firmware or software is causing the current power consumption to exceed the maximum power draw threshold value, the method may proceed to block 514 for diagnosis of driver health at the sustainability engine.

At block 506, in an embodiment in which the adaptive CO2 emissions reduction system has determined that operation of hardware is causing the current power consumption to exceed the maximum power draw threshold value as determined from levels of CO2 or other GHGs generated, the adaptive CO2 emissions reduction system may recommend, via a graphical user interface (GUI) that the user decrease power supplied to the network interface device, or shift transmission of data from one network interface device to another, lower power network interface device. For example, in an embodiment in which the adaptive CO2 emissions reduction system 250 determines the WWAN interface device or WLAN interface device (e.g., 220) is currently configured for high performance (high data transmission), rather than low power consumption, the adaptive CO2 emissions reduction system 250 may recommend to the user, via the GUI 290, that the user decrease power made available to the WWAN or WLAN interface device 220. In such an embodiment, the adaptive CO2 emissions reduction system 250 may suggest the power supplied to the network interface device 220 be reduced enough to bring the total power consumption at the first client information handling system 200 below the maximum power draw threshold value that was determined from CO2 or GHG levels that would result (e.g., based partly on energy or power source used). In another embodiment, the adaptive CO2 emissions reduction system 250 may suggest, via GUI 290, that the user switch at least a portion of data transceiving tasks from the WWAN or WLAN interface device to a Bluetooth network interface device, which requires less power for transmission than the WWAN or WLAN interface devices.

The adaptive CO2 emissions reduction system in an embodiment may recommend to the user, via a GUI, termination of certain software or firmware applications consuming CPU resources over a preset CPU utilization threshold value at block 508. For example, the adaptive CO2 emissions reduction system 250 may recommend termination of software or firmware applications identified as consuming a large proportion of CPU 242 resources, or limiting processor resources made available to those processes.

At block 510, the adaptive CO2 emissions reduction system in an embodiment may recommend to the user, via a GUI, placing the display into a power savings or standard definition mode. For example, in an embodiment in which the adaptive CO2 emissions reduction system 250 determines the display device 245 is currently configured for high performance (high definition display), rather than low power consumption, the adaptive CO2 emissions reduction system 250 may recommend, via GUI 290, that the user adjust the policies for the display 245 to place the display in a standard definition mode or a low power mode.

The adaptive $CO_2$ emissions reduction system in an embodiment may recommend to the user, via a GUI, disabling location or sensing services, temporarily or intermittently, or placing location or sensing devices into a low power mode at block 512. For example, in an embodiment in which the adaptive $CO_2$ emissions reduction system 250 determines the camera 248 is currently configured for high performance (continuous monitoring and high resolution image capture), rather than low power consumption, the adaptive $CO_2$ emissions reduction system 250 may recommend, via GUI 290, that the user adjust the policies for the camera 248 to turn off continuous monitoring or decrease image capture resolution. In some embodiments, the adaptive $CO_2$ emissions reduction system 250 may receive prompts from the user, via GUI 290, to initiate the recommended policy changes and may instruct the power analytics module 240 to initiate those changes. In such a way, the adaptive $CO_2$ emissions reduction system may monitor power consumption at a client information handling system and its generation of $CO_2$ levels of other GHG levels and adaptively recommend adjustments to policies and configurations for hardware in order to decrease power usage during high power consumption periods to decrease $CO_2$ or GHG emissions. The method for adjusting hardware configurations to decrease $CO_2$ emissions at an information handling system may then end.

At block 514, in an embodiment in which the adaptive $CO_2$ emissions reduction system determines that execution of firmware or updating of firmware or software is causing the current power consumption to exceed the maximum power draw threshold value as determined based on levels of $CO_2$ or other GHGs that would be produced, the adaptive $CO_2$ emissions reduction system may transmit a notification of the high-power consumption warning to the sustainability engine. As described herein, in the absence of identification of a high-performance hardware setting, the adaptive $CO_2$ emissions reduction system may communicate with the SIHA 283 to determine a possible cause of the high consumption rate by firmware execution or updating of software or firmware. This may begin with the adaptive $CO_2$ emissions reduction system 250 in an embodiment transmitting a notification of the high-power consumption warning received at block 502 to the systems internal health assessment module (SIHA) 283 of the Unified Endpoint Management (UEM) platform 280), via the sustainability engine 281.

The systems internal health assessment module (SIHA) in an embodiment may transmit an identification of a driver installation or underperformance associated with the high-power consumption warning, a most updated version of the driver, or obsolete or redundant files associated with the driver to the adaptive $CO_2$ emissions reduction system at block 516. The SIHA 283 in an embodiment may search telemetry 282 data to identify indications within the indexed and classified JSON incidents of inefficient or unnecessary firmware or software updates and poor driver performance. For example, the SIHA 283 in an embodiment may search the indexed and classified JSON incident described above to identify the JSON event named "incident_class," having a value "driver_perf," indicating poor driver performance, and identify the JSON event named "unsuccessful_driver_install_attempts," having a value of "display_driver_14.3," or the JSON event named "device_driver_call_failure_rate," having a value of 0.55, which may be above a preset maximum driver call failure rate of 50%. Either of these JSON events so identified by the SIH 283 in an embodiment may indicate that the display device driver is the underperforming driver that caused the JSON incident to be classified under the driver performance classification. In such an embodiment, the SIHA 283 may reference the JSON event "display driver version," having a value of 14.2 to identify that version 14.2 of the display driver is currently operating at the first client information handling system 200.

When the SIHA 283 has identified a specific driver of software application and a specific version of that driver or software application causing high power consumption and high $CO_2$ or other GHG production based on distributed power $CO_2$ emissions of power used, the SIHA 283 may communicate with an update service 286 to identify the most current version of the driver or software application and any redundant or obsolete files that may have been installed at the first client information handling system 200 during previous updates to that driver or software application. The SIHA 283 may also retrieve an estimated installation time for the most current version of the driver in an embodiment. If the driver underperformance in an embodiment is due to improper or failed installation of the most recent update, the time to install that update at the first client information handling system 200 may be significantly longer than the estimated or average time for successful installation of that update at other client information handling systems (e.g., 270), for example. The SIHA 283 may transmit the identification of the most current driver version, any redundant or obsolete files that may have been installed at the first client information handling system 200 during previous updates, and the average or estimated installation time for the most recent update to the first client information handling system 200 via the sustainability engine 281 in an embodiment.

At block 518, the adaptive $CO_2$ emissions reduction system in an embodiment may pause repeated attempts at unsuccessful installations of drivers identified by the SIHA at block 516. In an embodiment, reducing or eliminating repeated unsuccessful attempts also reduces unnecessary power consumption to further reduce levels of $CO_2$ or other GHG production below acceptable or set levels by a client information handling system. For example, in an embodiment in which the estimated or average time for successful installation of an update of firmware or software applications is less than the time consumed during one or more previous installation attempts at the first information handling system 200, the adaptive $CO_2$ emissions reduction system 250 may recommend, via the GUI 290, that the user pause any repeated attempts at unsuccessful installation of the driver or software application associated with that elongated installation time. In another example, the adaptive $CO_2$ emissions reduction system 250 may reference the indexed and classified JSON incident above to identify the JSON event named "unsuccessful_driver_install_attempts," having a value of "display_driver_14.3," indicating a failed attempt at installing the display driver version 14.3. In such a scenario, the adaptive $CO_2$ emissions reduction system 250 may recommend that the user pause or terminate future attempts at installing the display driver version 14.3. Such a repeated failure may indicate a flaw in the driver installation package itself, and may require downloading of the most updated driver installation package, as described directly below with respect to block 520.

The adaptive $CO_2$ emissions reduction system in an embodiment may download the most updated drivers or delete obsolete or non-optimized drivers identified by the SIHA at block 516. For example, the adaptive $CO_2$ emissions reduction system 250 may reference the indexed and classified JSON incident above to identify the JSON event named "device_driver_call_failure_rate," having a value of 0.55, which may be above a preset maximum driver call failure rate of 50%. In such an example embodiment, the adaptive CO2 emissions reduction system 250 may recommend that the user download the most recent version of that driver, as identified by the SIHA 283. The adaptive CO2 emissions reduction system 250 in such an embodiment may further recommend deletion of previous versions of the driver that may interfere with proper execution of the most recent version of the driver, thus generating additional power consumption and unnecessary CO2 or GHG production at the distributed power CO2 emissions value applied to the power used.

At block 522, the adaptive CO2 emissions reduction system in an embodiment may delete obsolete or redundant files identified by the SIHA at block 516. For example, the adaptive CO2 emissions reduction system in an embodiment may recommend the user delete any obsolete or redundant files associated with the underperforming driver or software application, as identified by the SIHA 283. In some embodiments, the adaptive CO2 emissions reduction system 250 may receive prompts from the user, via GUI 290, to initiate the recommended changes to firmware execution or updates to firmware or software and may instruct the power analytics module 240 or the analytics module 230 to initiate those changes. In such a way, the adaptive CO2 emissions reduction system may monitor power consumption levels to be below maximum levels for carbon dioxide or other GHG production based on distributed power CO2 emissions value that applies to the power being used at a client information handling system in an embodiment. Thus, the adaptive CO2 reduction system may adaptively recommend adjustments to execution of firmware or updates to firmware or software in order to decrease power usage during high power consumption periods. The method of adaptively adjusting policies and configurations for hardware or firmware or methods of updating software or firmware to decrease power usage during high power consumption periods and reduce CO2 or other GHG production levels below a maximum threshold for the client information handling system may then end.

The blocks of the flow diagrams of FIGS. 3, 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An adaptive carbon dioxide (CO2) emissions reduction system operating on a client information handling system comprising:
   a processor executing code instructions of the adaptive CO2 emissions reduction system to:
      gather telemetry over a preset monitoring period including application analytics for a software application executing at the client information handling system and hardware power consumption analytics for the client information handling system operating at a measured geographic location;
   a first network interface device to transmit the telemetry to a Unified Endpoint Management (UEM) platform and receive from the UEM platform a distributed power CO2 emissions value estimating CO2 emission per Watt of power consumed at the measured geographic location;
   the processor to:
      determine a power CO2 emissions value estimating CO2 emitted during a measured consumption of power over the preset monitoring period, as described in the hardware power consumption analytics;
      receive a user-specified optimal maximum CO2 emissions value;
      determine a maximum power draw threshold value, based on the user-specified optimal maximum CO2 emissions value and the geographic location;
      determine an updated power consumption at the client information handling system exceeds the maximum power draw threshold value; and
   a graphical user interface (GUI) to display a hardware reconfiguration recommendation for reconfiguring a hardware component currently configured for high performance to a power conservation setting.

2. The adaptive CO2 emissions reduction system of claim 1, wherein the hardware reconfiguration recommendation includes a recommendation to limit power supplied to the first network interface device to reduce CO2 emissions of the client information handling system below the user-specified optimal maximum CO2 emissions value.

3. The adaptive CO2 emissions reduction system of claim 1, wherein the hardware reconfiguration recommendation includes a recommendation to cease transmission of data via the first network interface device and to transceive data via a second network interface device to reduce CO2 emissions of the client information handling system below the user-specified optimal maximum CO2 emissions value.

4. The adaptive CO2 emissions reduction system of claim 1, wherein the hardware reconfiguration recommendation includes a recommendation to reset a policy for a display to a standard definition mode to reduce CO2 emissions of the client information handling system below the user-specified optimal maximum CO2 emissions value.

5. The adaptive CO2 emissions reduction system of claim 1, wherein the hardware reconfiguration recommendation includes a recommendation to reset a policy for a display to a low-power mode to reduce CO2 emissions of the client information handling system below the user-specified optimal maximum CO2 emissions value.

6. The adaptive CO2 emissions reduction system of claim 1, wherein the hardware reconfiguration recommendation includes a recommendation to turn off a sensing hardware component to reduce CO2 emissions of the client information handling system below the user-specified optimal maximum CO2 emissions value.

7. The adaptive CO2 emissions reduction system of claim 1, wherein the hardware reconfiguration recommendation includes a recommendation to decrease frequency of use of a sensing hardware component to reduce CO2 emissions of the client information handling system below the user-specified optimal maximum CO2 emissions value.

8. A method for adaptively reducing carbon dioxide (CO2) emissions of a client information handling system comprising:
gathering, via a processor, telemetry over a preset monitoring period including application analytics for a version of firmware executing at the client information handling system and hardware power consumption analytics for the client information handling system operating at a measured geographic location;
transmitting, via a network interface device, the telemetry to a Unified Endpoint Management (UEM) platform;
receiving from the UEM platform a distributed power CO2 emissions value estimating CO2 emission per Watt of power consumed at the measured geographic location;
determining a power CO2 emissions value estimating CO2 emitted during a measured consumption of power over the preset monitoring period, as described in the hardware power consumption analytics;
receiving a user-specified optimal maximum CO2 emissions value;
determining a maximum power draw threshold value, based on the user-specified optimal maximum CO2 emissions value and the geographic location;
determining an updated power consumption at the client information handling system exceeds the maximum power draw threshold value; and
displaying, via a graphical user interface (GUI), a firmware reconfiguration recommendation for adjusting execution of the version of firmware or a method of update for the version of firmware.

9. The method of claim 8, wherein the firmware reconfiguration recommendation includes a recommendation to terminate attempts at installing the version of firmware to reduce CO2 emissions of the client information handling system below the user-specified optimal maximum CO2 emissions value.

10. The method of claim 8, wherein the firmware reconfiguration recommendation includes a recommendation to limit a percentage of resources of the processor made available for execution of the version of firmware to reduce CO2 emissions of the client information handling system below the user-specified optimal maximum CO2 emissions value.

11. The method of claim 8, wherein the firmware reconfiguration recommendation includes a recommendation to download a more recent version of the version of firmware to reduce CO2 emissions of the client information handling system below the user-specified optimal maximum CO2 emissions value.

12. The method of claim 8 further comprising:
receiving from the UEM platform an identification of an obsolete or redundant file associated with the version of firmware or a previous version of firmware; and
recommending deletion of the obsolete or redundant files at the client information handling system to reduce CO2 emissions of the client information handling system below the user-specified optimal maximum CO2 emissions value.

13. The method of claim 8 further comprising:
receiving from the UEM platform an average time of installation across a plurality of additional client information handling systems for the version of firmware;
determining a time of installation for the version of firmware at the client information handling system exceeds the average time of installation; and
recommending deletion of the obsolete or redundant files at the client information handling system to reduce CO2 emissions of the client information handling system below the user-specified optimal maximum CO2 emissions value.

14. The method of claim 8 further comprising:
receiving from the UEM platform an average time of installation of previous firmware versions at the client information handling system during previous monitoring periods;
determining a time of installation for the version of firmware at the client information handling system exceeds the average time of installation; and
recommending download of a more recent version of the version of firmware to reduce CO2 emissions of the client information handling system below the user-specified optimal maximum CO2 emissions value.

15. An adaptive carbon dioxide (CO2) emissions reduction system operating on a client information handling system comprising:
a processor executing code instructions of the adaptive CO2 emissions reduction system to:
gather telemetry over a preset monitoring period including application analytics for a software application executing at the client information handling system and hardware power consumption analytics for the client information handling system operating at a measured geographic location;
a network interface device to transmit the telemetry to a Unified Endpoint Management (UEM) platform and receive from the UEM platform a distributed power CO2 emissions value estimating CO2 emission per Watt of power consumed at the measured geographic location;
the processor to:
determine a power CO2 emissions value estimating CO2 emitted during a measured consumption of power over the preset monitoring period, as described in the hardware power consumption analytics;
receive a user-specified optimal maximum CO2 emissions value;
determining a maximum power draw threshold value, based on the user-specified optimal maximum CO2 emissions value and the geographic location;
determine an updated power consumption at the client information handling system exceeds the maximum power draw threshold value; and a graphical user interface (GUI) to display a hardware reconfiguration recommendation for reconfiguring a hardware component currently configured for high performance to a power conservation setting or a software update reconfiguration recommendation for adjusting an update method for the software application.

16. The adaptive CO2 emissions reduction system of claim 15, wherein the hardware reconfiguration recommendation includes a recommendation to terminate location services to reduce CO2 emissions of the client information handling system below the user-specified optimal maximum CO2 emissions value.

17. The adaptive CO2 emissions reduction system of claim 15, wherein a firmware reconfiguration recommendation is provided and includes a recommendation to terminate attempts at installing the software application to reduce CO2 emissions of the client information handling system below the user-specified optimal maximum CO2 emissions value.

18. The adaptive CO2 emissions reduction system of claim 15 further comprising:

receiving from the UEM platform an identification of an obsolete or redundant file associated with the software application or a previous version of the software application; and recommending deletion of the obsolete or redundant files at the client information handling system to reduce CO2 emissions of the client information handling system below the user-specified optimal maximum CO2 emissions value.

19. The adaptive CO2 emissions reduction system of claim 15 further comprising:

receiving from the UEM platform an average time of installation across a plurality of additional client information handling systems for the software application;

determining a time of installation for the software application at the client information handling system exceeds the average time of installation; and recommending termination of attempts at installing the version of firmware to reduce CO2 emissions of the client information handling system below the user-specified optimal maximum CO2 emissions value.

20. The adaptive CO2 emissions reduction system of claim 15 further comprising:

receiving from the UEM platform an average time of installation of previous versions of the software application at the client information handling system during previous monitoring periods;

determining a time of installation for the software application at the client information handling system exceeds the average time of installation; and recommending download of a more recent version of the version of firmware to reduce CO2 emissions of the client information handling system below the user-specified optimal maximum CO2 emissions value.

* * * * *